(12) United States Patent
Makimoto et al.

(10) Patent No.: US 8,780,312 B2
(45) Date of Patent: Jul. 15, 2014

(54) LIQUID CRYSTAL PANEL, LIQUID CRYSTAL DISPLAY DEVICE, METHOD FOR PRODUCING LIQUID CRYSTAL PANEL, AND METHOD FOR MANUFACTURING LIQUID CRYSTAL DISPLAY DEVICE

(75) Inventors: Shota Makimoto, Tottori (JP); Katsunori Misaki, Tottori (JP)

(73) Assignee: Sharp Kabushiki Kaisha, Osaka (JP)

( * ) Notice: Subject to any disclaimer, the term of this patent is extended or adjusted under 35 U.S.C. 154(b) by 61 days.

(21) Appl. No.: 13/574,355

(22) PCT Filed: Nov. 18, 2010

(86) PCT No.: PCT/JP2010/070604
§ 371 (c)(1),
(2), (4) Date: Jul. 20, 2012

(87) PCT Pub. No.: WO2011/092926
PCT Pub. Date: Aug. 4, 2011

(65) Prior Publication Data
US 2012/0287391 A1    Nov. 15, 2012

(30) Foreign Application Priority Data

Jan. 28, 2010  (JP) ................................. 2010-016921

(51) Int. Cl.
*G02F 1/1339* (2006.01)
(52) U.S. Cl.
USPC ............ 349/153; 349/106; 349/154; 349/190

(58) Field of Classification Search
USPC .......................... 349/106–108, 153–154, 190
See application file for complete search history.

(56) References Cited

U.S. PATENT DOCUMENTS

| 6,010,384 A | 1/2000 | Nishino et al. |
| 6,297,869 B1 | 10/2001 | Choo et al. |

FOREIGN PATENT DOCUMENTS

| JP | 10-301072 A | 11/1998 |
| JP | 11-72773 A | 3/1999 |
| JP | 2001-56455 A | 2/2001 |
| JP | 2002-31806 A | 1/2002 |
| JP | 2008-262005 A | 10/2008 |

OTHER PUBLICATIONS

International Search Report received for PCT Patent Application No. PCT/JP2010/070604, mailed on Dec. 28, 2010, 5 pages. (2 pages of English translation and 3 pages of PCT Search Report).

*Primary Examiner* — Phu Vu
(74) *Attorney, Agent, or Firm* — Morrison & Foerster LLP

(57) ABSTRACT

A liquid crystal panel (1) includes (i) a CF substrate (2) on which a color filter is to be formed, (ii) a TFT substrate (3) on which a thin film transistor is to be formed, (iii) a sealing material (4) for sealing liquid crystal injected between the CF substrate (2) and the TFT substrate (3), (iv) a liquid crystal inlet (6) through which the liquid crystal is injected, and (v) structures (20) provided between a cut surface among cut surfaces of the liquid crystal panel (1), on which cut surface the liquid crystal inlet (6) is to be formed, and edges (4a) of the sealing material (4). The structures (20) each are made from a material from which the color filter is formed.

3 Claims, 13 Drawing Sheets

LIQUID CRYSTAL PANEL, LIQUID CRYSTAL DISPLAY DEVICE, METHOD FOR PRODUCING LIQUID CRYSTAL PANEL, AND METHOD FOR MANUFACTURING LIQUID CRYSTAL DISPLAY DEVICE

TECHNICAL FIELD

The present invention relates to a liquid crystal panel, a liquid crystal display device, a method for producing the liquid crystal panel, and a method for producing the liquid crystal display device.

BACKGROUND ART

FIG. 11 is an explanatory view of a conventional liquid crystal panel 101. (a) of FIG. 11 is a plain view of a conventional liquid crystal panel 101 to be used in a liquid crystal display device. (b) of FIG. 11 is a cross-sectional view illustrating a liquid crystal inlet 106 of the conventional liquid crystal panel 101.

The conventional liquid crystal panel 101 includes (i) a CF substrate 102, made from glass, on which a CF (Color Filter) is to be formed, (ii) a TFT substrate 103, made from glass, on which a TFT (Thin Film Transistor) is to be formed, and (iii) a sealing material (sealant) 104 for sealing liquid crystal (see (a) of FIG. 11). The CF substrate 102 and the TFT substrate 103 constitute a substrate assembly 109 (later described). Liquid crystal is injected through the liquid crystal inlet 106 into a region 105 which is sandwiched between the CF substrate 102 and the TFT substrate 103 and surrounded by the sealing material 104, so that the liquid crystal panel 101 is produced.

The liquid crystal inlet 106 of the liquid crystal panel 101 is formed between the CF substrate 102 and the TFT substrate 103, and formed so as to be sandwiched between two sealing materials 104 (see (b) of FIG. 11).

A process for producing the liquid crystal panel 101 includes a substrate assembly forming process and a substrate assembly cutting process. The substrate assembly forming process is a process for forming the substrate assembly 109 by bonding the CF substrate 102 and the TFT substrate 103 to each other such that the sealing material 104 is sandwiched between the CF substrate 102 and the TFT substrate 103. The substrate assembly cutting process is a process for scribing (cutting) the substrate assembly 109 after the substrate assembly forming process. First, the substrate assembly forming process will be described below with reference to (a) through (f) of FIG. 12.

FIG. 12 is an explanatory view of production of a conventional liquid crystal panel 101. (a) through (f) of FIG. 12 are explanatory views of a process for producing the conventional liquid crystal panel 101. According to the process illustrated in FIG. 12, a sealing material 104 is drawn (formed) on a CF substrate 102. Note, however, that the sealing material 104 can be drawn (formed) on a TFT substrate 103 instead of the CF substrate 102.

(a) of FIG. 12 is a plain view illustrating the CF substrate 102 onto which the sealing material 104 is to be drawn. (b) of FIG. 12 is a cross-sectional view taken along P-P' line of (a) of FIG. 12. A sealing material draw line 107 is formed on the CF substrate 102 illustrated in (a) of FIG. 12. A draw nozzle 108 draws the sealing material 104 along the sealing material draw line 107. In (a) of FIG. 12, the sealing material 104 has not been drawn yet, and therefore the sealing material 104 has not been shown in the P-P' line cross-sectional view of (b) of FIG. 12.

(c) of FIG. 12 is a plain view illustrating the CF substrate 102 onto which the sealing material 104 is being drawn. (d) of FIG. 12 is a cross-sectional view taken along P-P' line of (c) of FIG. 12. The draw nozzle 108 draws the sealing material 104, for example, from a start edge 107a of the sealing material draw line 107 to an end edge 107b of the sealing material draw line 107. The P-P' line cross-sectional view of (d) of FIG. 12 illustrates the sealing material 104 which is closer to P than P'.

(e) of FIG. 12 is a plain view illustrating a substrate assembly 109 in which the CF substrate 102 onto which the sealing material 104 has been drawn, and the TFT substrate 103 are bonded to each other. (f) of FIG. 12 is a cross-sectional view taken along a CF substrate/TFT substrate scribing line 112 of (e) of FIG. 12. The TFT substrate 103, and the CF substrate 102 onto which the draw nozzle 108 has drawn the sealing material 104 from the start edge 107a to the end edge 107b, are bonded to each other so as to form the substrate assembly 109. The P-P' line cross-sectional view of (f) of FIG. 12 illustrates the sealing material 104 which is closer to P than P', and the sealing material 104 which is closer to P' than P.

The following describes the substrate assembly cutting process with reference to (e) and (f) of FIG. 12. The substrate assembly 109 illustrated in (e) and (f) of FIG. 12 is scribed by use of a diamond cutter (glass cutter) 110. Specifically, the diamond cutter 110 scribes the CF substrate 102 and the TFT substrate 103 along CF substrate/TFT substrate scribing lines 111 through 113 illustrated in (e) of FIG. 12. Further, the diamond cutter 110 scribes the CF substrate 102 along a CF substrate scribing line 114 illustrated in (e) of FIG. 12, and scribes the TFT substrate 103 along a TFT substrate scribing line 115 illustrated in (e) of FIG. 12. Thereafter, liquid crystal is injected through a liquid crystal inlet 106 into a region 105 surrounded by the sealing material 104, so that the liquid crystal panel 101 illustrated in (a) of FIG. 11 is produced.

Patent Literatures 1 through 4 disclose respective inventions each including a process for scribing a glass substrate in such a manner that the liquid crystal panel 101 is scribed.

FIG. 13, corresponding to FIG. 4 of Patent Literature 1, is a cross-sectional view illustrating a liquid crystal display panel 116 of Patent Literature 1. Spacers 119' are provided, densely than spacers 119 provided in a display section 118, in a region centering on a scribing line 117, which region extends away by 3 mm from the scribing line 117 on both sides of the scribing line 117. This causes cracks to open vertically when the liquid crystal display panel 116 is scribed, thereby preventing occurrence of a defect caused by glass crack or glass fragment. In FIG. 13, reference numeral 120 represents a sealing material, and reference numerals 121 and 122 represent respective glass substrates.

FIG. 14, corresponding to FIG. 1 of Patent Literature 2, is a cross-sectional view illustrating a liquid crystal display element 123 of Patent Literature 2. The liquid crystal display element 123 includes (i) a pair of an upper glass substrate 124 and a lower glass substrate 125, (ii) a sealing material 127 for forming a display region 126 between the pair of the upper glass substrate 124 and the lower glass substrate 125, (iii) first pillar spacers 128 for keeping a thickness of a liquid crystal layer uniform in the display region 126, and (iv) second pillar spacers 128 provided, outside the display region 126, between the pair of the upper glass substrate 124 and the lower glass substrate 125. The pair of the upper glass substrate 124 and the lower glass substrate 125 are bonded to each other. Thereafter, a part of the upper glass substrate 124, which part faces a connection terminal 129, is separated from the rest of the upper glass substrate 124.

Therefore, the second pillar spacers 128 provided outside the display region 126 can prevent an edge member 130 that is a cut part of the upper glass substrate 124 from coming in contact with the lower glass substrate 125, after the part of the upper glass substrate 124 is separated from the rest of the upper glass substrate 124. Therefore, the edge member 130 can be easily removed without its edge damaging the connection terminal 129, by providing the second pillar spacers 128, and it is therefore possible to prevent occurrence of a defect caused by damage to the connection terminal 129. Note that in FIG. 14, reference numeral 131 represents a pixel electrode, reference numeral 132 represents liquid crystal, and reference numeral 133 represents an electrode layer.

FIG. 15 is an explanatory view of a liquid crystal display device panel of Patent Literature 3. (a) of FIG. 15, corresponding to FIG. 5 of Patent Literature 3, is a view illustrating a liquid crystal display device panel 134 of Patent Literature 3. (b) of FIG. 15, corresponding to FIG. 6 of Patent Literature 3, is an enlarged view of a part circled by a circle 135 illustrated in (a) of FIG. 15.

A seal line, which formed a liquid crystal inlet 136, is located inside a cut line 137 (see (a) of FIG. 15). A seal line 138, which forms the liquid crystal inlet 136, includes (i) a first line 138a having an opening of the seal line 138 having a square frame shape (ii) second lines 138b, each having a first length, which extend vertically from respective edges of the first line 138a, between which edges the opening is formed, and (iii) third lines 138c, each having a second length, which extend vertically from edges of the respective second lines 138b in respective directions away from the opening so as to be parallel to the cut line 137 (see (b) of FIG. 15).

In (a) of FIG. 15, reference numeral 139 represents a substrate assembly, and reference numerals 140 through 142 represent respective cut lines. In (b) of FIG. 15, reference numeral 143 represents a sealing material, and reference numeral d represents a gap.

FIG. 16 is an explanatory view of a liquid crystal display device of Patent Literature 4. (a) of FIG. 16, corresponding to FIG. 1(a) of Patent Literature 4, is a plain view illustrating the liquid crystal display device. (b) of FIG. 16, corresponding to FIG. 1(b) of Patent Literature 4, is a cross-sectional view illustrating the liquid crystal display device.

As illustrated in (a) and (b) of FIG. 16, transparent electrodes 146 and 147 are formed on upper and lower glass substrates 144 and 145, respectively, and alignment films 148 and 149 are formed on the transparent electrodes 146 and 147, respectively. The alignment films 148 and 149 are subjected to an alignment process. The upper and lower glass substrates 144 and 145 are bonded to each other via a sealing material 150 so as to form a gap serving as a liquid crystal layer 151. A low-adhesive thin film 154 is formed in advance (i) on a region of the upper glass substrate 144, which region faces a projecting part 152 and (ii) where an extended part of the sealing material 150 forms a liquid crystal inlet 153, so that adhesiveness to the sealing material 150 is reduced.

CITATION LIST

Patent Literature

Patent Literature 1
Japanese Patent Application Publication, Tokukaihei No. 11-72773 A (Publication Date: Mar. 16, 1999)
Patent Literature 2
Japanese Patent Application Publication, Tokukai No. 2002-31806 A (Publication Date: Jan. 31, 2002)
Patent Literature 3
Japanese Patent Application Publication, Tokukai No. 2001-56455 A (Publication Date: Feb. 27, 2001)
Patent Literature 4
Japanese Patent Application Publication, Tokukaihei No. 10-301072 A (Publication Date: Nov. 13, 1998)

SUMMARY OF INVENTION

Technical Problem

In a substrate assembly cutting process (see FIG. 12), a defect such as burr and crack is caused in a part of a sealing material 104, in which part a liquid crystal inlet 106 is formed. The following describes the reason why such a defect is caused.

A substrate assembly 109 is scribed (a liquid crystal panel 101 is cut out) through the part of the sealing material 104, in which part the liquid crystal inlet 106 is formed. Specifically, a CF substrate 102 and a TFT substrate 103 are scribed along a CF substrate/TFT substrate scribing line 112 (see (e) of FIG. 12).

The sealing material 104 contains glass fiber so as to have a high hardness, so that the sealing material 104 can control a cell thickness of liquid crystal. Therefore, a diamond cutter 110 applies different pressures to a first part and a second part of a glass substrate (the CF substrate 102 or the TFT substrate 103), onto which first part no sealing material 104 is drawn, onto which second part the sealing material 104 is drawn. This causes the defect such as burr and crack.

According to an invention of Patent Literature 1, spacers 119 are relatively thinly provided in a display section 118 distant from a scribing line SL than in a region centering on the scribing line SL, which region extends away by 3 mm from the scribing line SL on both sides of the scribing line 117. This causes cracks to open vertically when a liquid crystal display panel 116 is scribed. Therefore, a cross section of the liquid crystal display panel 116 scribed along the scribing line SL becomes sharp.

According to an invention of Patent Literature 3, in a case where drawing of a sealing material 143 is stopped around a liquid crystal inlet 136, there is a possibility that a seal edge becomes thick, the liquid crystal inlet 136 becomes narrow, and therefore a liquid crystal injection rate is decreased. Not only the seal edge possibly becomes thick but also there is a possibility that the seal edge has a thickness different from a start of drawing of the sealing material 143 to an end of drawing of the sealing material 143, and the seal edge protrudes over a cut line 137. In order to prevent the seal edge from protruding over the cut line 137, the cut line 137 can be formed away from the liquid crystal inlet 136 in advance. This, however, expands a frame. Further, increase in a gap D makes it impossible to inject liquid crystal. Keeping the seal edge away from the liquid crystal inlet 136 (see (b) of FIG. 15) necessitates a space between where liquid crystal is to be sealed to a panel edge, thereby expanding the frame.

According to an invention of Patent Literature 4, upper and lower glass substrates 144 and 145 are scribed along a scribing line 155 (see (b) of FIG. 16). Therefore, a part where no sealing material 150 is formed, and a part where the sealing material 150 is formed are cut (scribed), as with the liquid crystal panel 101 illustrated in FIG. 11. That is, a glass cutter applies different pressures to the respective parts. This causes a defect such as burr and crack.

The present invention was made in view of the conventional problems, and an object of the present invention is to provide (i) a liquid crystal panel capable of reducing a defect, such as burr and crack, which is caused during production of a conventional liquid crystal panel, (ii) a liquid crystal display device, (iii) a method for producing the liquid crystal panel, and (iv) a method for producing the liquid crystal display device.

Solution to Problem

In order to attain the object, a liquid crystal panel of the present invention is configured to include: a filter substrate on which a color filter is formed; a transistor substrate on which a thin film transistor is formed; a first sealant for sealing liquid crystal injected between the filter substrate and the transistor substrate; a liquid crystal inlet through which the liquid crystal is injected; and first structures being provided between a cut surface among cut surfaces of the liquid crystal panel, on which cut surface the liquid crystal inlet is to be formed, and edges of the first sealant, the first structures each being made from a material from which the color filter is formed or a material from which the thin film transistor is formed.

In order to attain the object, a method of the present invention for producing a liquid crystal panel is arranged to include the steps of: forming a color filter on a filter substrate; forming a thin film transistor on a transistor substrate; forming first structures, on the filter substrate or the transistor substrate, between a cut surface among cut surfaces of the liquid crystal panel, on which cut surface a liquid crystal inlet is to be formed, and edges of a first sealant; forming, on the filter substrate or the transistor substrate, the first sealant for sealing liquid crystal injected between the filter substrate and the transistor substrate; forming a substrate assembly by bonding the filter substrate and the transistor substrate to each other; and forming the liquid crystal panel by cutting the substrate assembly, the first structures each being made from a material from which the color filter is formed or a material from which the thin film transistor is formed.

According to the present invention, the first structures, each made from the material from which the color filter is formed or the material from which the thin film transistor is formed, are provided between the cut surface among the cut surfaces of the liquid crystal panel, on which cut surface the liquid crystal inlet is to be formed, and the edges of the first sealant, but no first sealant is provided. This decreases change in pressure to be applied by a cutter during formation of the liquid crystal inlet (during cutting of the substrate assembly), as compared with during production of a conventional liquid crystal panel. Therefore, a defect, such as burr and crack, which is caused during production of the conventional liquid crystal panel, can be reduced. That is, the defect such as burr and crack is further unlikely to be caused, or can be reduced in its size.

Advantageous Effects of Invention

A liquid crystal panel of the present invention is a liquid crystal panel, including: a filter substrate on which a color filter is formed; a transistor substrate on which a thin film transistor is formed; a first sealant for sealing liquid crystal injected between the filter substrate and the transistor substrate; a liquid crystal inlet through which the liquid crystal is injected; and first structures being provided between a cut surface among cut surfaces of the liquid crystal panel, on which cut surface the liquid crystal inlet is to be formed, and edges of the first sealant, the first structures each being made from a material from which the color filter is formed or a material from which the thin film transistor is formed.

A method of the present invention for producing a liquid crystal panel is a method for producing a liquid crystal panel, including the steps of: forming a color filter on a filter substrate; forming a thin film transistor on a transistor substrate; forming first structures, on the filter substrate or the transistor substrate, between a cut surface among cut surfaces of the liquid crystal panel, on which cut surface a liquid crystal inlet is to be formed, and edges of a first sealant; forming, on the filter substrate or the transistor substrate, the first sealant for sealing liquid crystal injected between the filter substrate and the transistor substrate; forming a substrate assembly by bonding the filter substrate and the transistor substrate to each other; and forming the liquid crystal panel by cutting the substrate assembly, the first structures each being made from a material from which the color filter is formed or a material from which the thin film transistor is formed.

It is therefore possible to provide (i) a liquid crystal panel capable of reducing a defect, such as burr and crack, which is caused during production of a conventional liquid crystal panel, (ii) a liquid crystal display device, (iii) a method for producing the liquid crystal panel, and (iv) a method for producing the liquid crystal display device.

DESCRIPTION OF EMBODIMENTS

The following description will discuss an embodiment of the present invention in Examples 1 through 5 with reference to FIGS. 1 through 10.

Example 1

Figure 1:
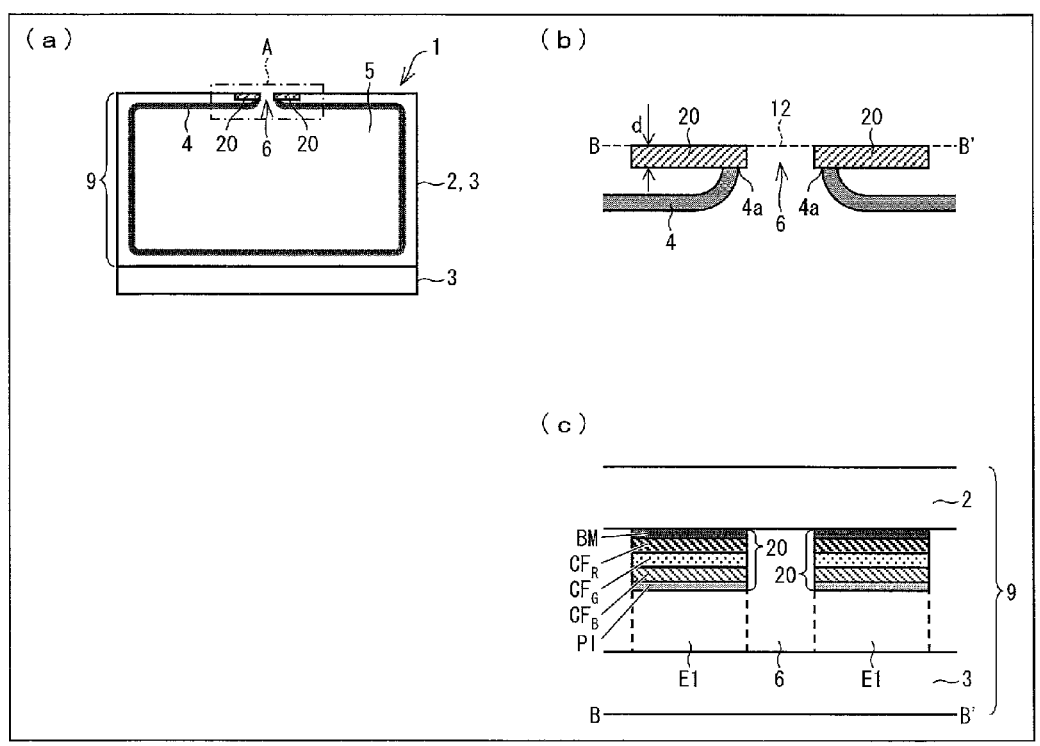
FIG. 1 is an explanatory view of a liquid crystal panel in accordance with an example of the present invention. (a) of FIG. 1 is a plain view illustrating the liquid crystal panel in accordance with the example of the present invention. (b) of FIG. 1 is an enlarged plain view of a region surrounded by an alternate long and short dash line of (a) of FIG. 1. (c) of FIG. 1 is a cross-sectional view taken along B-B' line of (b) of FIG. 1.
Figure 2:
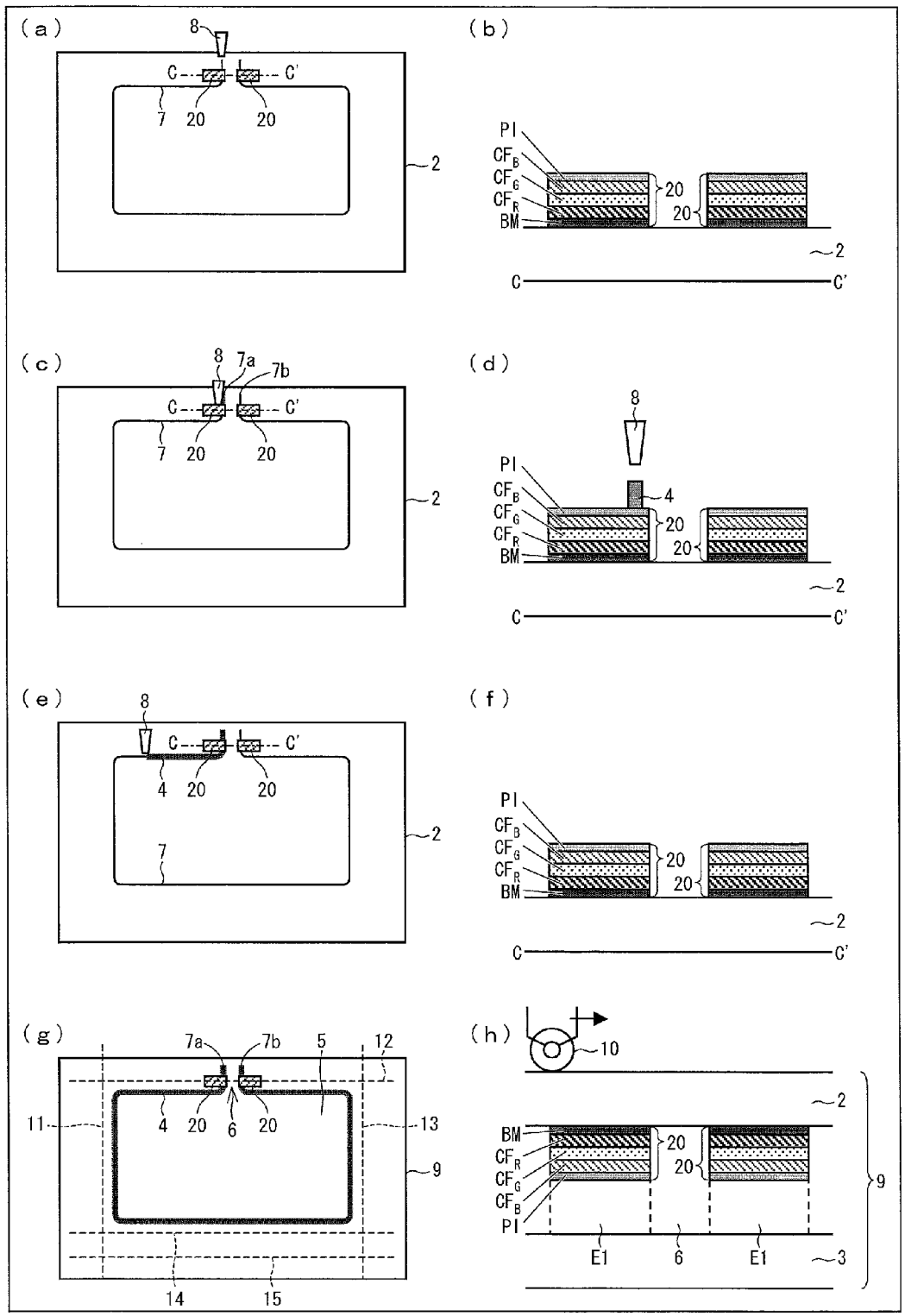
FIG. 2 is an explanatory view of production of a liquid crystal panel in accordance with an example of the present invention. (a) through (h) of FIG. 2 are explanatory views of a process for producing the liquid crystal panel in accordance with the example of the present invention.

The following describes Example 1 of the present invention with reference to FIGS. 1 and 2.

FIG. 1 is an explanatory view of a liquid crystal panel 1 of Example 1. (a) of FIG. 1 is a plain view of the liquid crystal panel 1 of Example 1. (b) of FIG. 1 is an enlarged plain view of a region surrounded by an alternate long and short dash line A of (a) of FIG. 1. (c) of FIG. 1 is a cross-sectional view taken along B-B' line of (b) of FIG. 1.

A liquid crystal panel 1 includes (i) a CF substrate (filter substrate) 2, made from glass, on which a CF (Color Filter) is to be formed, (ii) a TFT substrate (transistor substrate) 3, made from glass, on which a TFT (Thin Film Transistor) is to be formed, and (iii) a sealing material (first sealant) 4 for sealing liquid crystal injected between the CF substrate 2 and the TFT substrate 3, (iv) a liquid crystal inlet 6 through which the liquid crystal is injected, and (v) structures 20 (first structures) provided between a cut surface among cut surfaces of the liquid crystal panel 1, on which cut surface the liquid crystal inlet 6 is to be formed, and edges 4a of the sealing material 4 (see (a) of FIG. 1). The structures 20 have respective surfaces on each of which an alignment film PI is provided. The CF substrate 2 and the TFT substrate 3 constitute a substrate assembly 9 (later described). Liquid crystal is injected through the liquid crystal inlet 6 into a region 5 which is sandwiched between the CF substrate 2 and the TFT substrate 3 and surrounded by the sealing material 4, so that the liquid crystal panel 1 is produced.

The liquid crystal inlet 6 of the liquid crystal panel 1 is formed between the CF substrate 2 and the TFT substrate 3 and between the two structures 20 (see (c) of FIG. 1). A configuration of the structures 20, and a positional relationship between the structures 20 and the liquid crystal inlet 6 will be described later.

A process for producing the liquid crystal panel 1 includes a substrate assembly forming process and a substrate assembly cutting process. The substrate assembly forming process is a process for forming the substrate assembly 9 by bonding the CF substrate 2 and the TFT substrate 3 to each other such that the sealing material 4 is sandwiched between the CF substrate 2 and the TFT substrate 3. The substrate assembly cutting process is a process for scribing (cutting) the substrate assembly 9 after the substrate assembly forming process. First, the substrate assembly forming process will be described below with reference to (a) through (h) of FIG. 2.

FIG. 2 is an explanatory view of production of the liquid crystal panel 1 of Example 1. (a) through (h) of FIG. 2 are explanatory views of a process for producing the liquid crystal panel 1 of Example 1. According to the process illustrated in FIG. 2, the sealing material 4 is drawn (formed) on the CF substrate 2. Note, however, that the sealing material 4 can be drawn (formed) on the TFT substrate 3 instead of the CF substrate 2. The case will be described in Example 2.

(a) of FIG. 2 is a plain view illustrating the CF substrate 2 onto which the sealing material 4 is to be drawn. (b) of FIG. 2 is a cross-sectional view taken along C-C' line of (a) of FIG. 2.

A sealing material draw line 7 is formed on the CF substrate 2 illustrated in (a) of FIG. 2. A draw nozzle (sealing material draw nozzle) 8 draws the sealing material 4 along the sealing material draw line 7. In (a) of FIG. 2, the sealing material 4 has not been drawn yet.

The structures 20, each made from a material from which the color filter is formed, are provided on the CF substrate 2 (see the C-C' line cross-sectional view of (b) of FIG. 2). More specifically, a black matrix BM, a color filter CFR of R (red), a color filter CFG of G (green), a color filter CFB of B (blue), and an alignment film PI are accumulated in this order on the CF substrate 2, but no sealing material 4 is provided on the alignment film PI. That is, the structures 20 each includes the black matrix BM, the color filter CFR of R (red), the color filter CFG of G (green), the color filter CFB of B (blue), and the alignment film PI.

(c) of FIG. 2 is a plain view illustrating the CF substrate 2 onto which the sealing material 4 is being drawn where one of the structures 20 is provided. (d) of FIG. 2 is a cross-sectional view taken along C-C' line of (c) of FIG. 2. The draw nozzle 8 draws the sealing material 4, for example, from a start edge 7a of the sealing material draw line 7 to an end edge 7b of the sealing material draw line 7.

The sealing material 4 is drawn on the alignment film PI of the structure 20 of the left side of the C-C' line cross-sectional view of (d) of FIG. 2. However, the sealing material 4 is repelled from the alignment film PI. Therefore, no sealing material 4 is left on the alignment film PI (see (f) of FIG. 2).

The alignment film PI is made from, for example, polyimide, and the sealing material 4 is made from, for example, solvent thermosetting epoxy resin, epoxy acrylic resin, UV cured epoxy resin or epoxy acrylic resin. The alignment film PI made from such a material can repel the sealing material 4, made from such a material, which is drawn on the alignment film PI.

(e) of FIG. 2 is a plain view illustrating the CF substrate 2 onto which the sealing material 4 is being drawn along a part of the sealing material draw line 7, which part follows the structure 20. (f) of FIG. 2 is a cross-sectional view taken along C-C' line of (e) of FIG. 2. No sealing material 4 is left on the alignment film PI in the C-C' line cross-sectional view of (f) of FIG. 2, because of the above-described reason.

(g) of FIG. 2 is a plain view illustrating the substrate assembly 9 in which the CF substrate 2 on which the sealing material 4 has been drawn, and the TFT substrate 3 are bonded to each other. (h) of FIG. 2 is a cross-sectional view taken along a CF substrate/TFT substrate scribing line (hereinafter simply referred to as a scribing line) 12 of (g) of FIG. 2. The TFT substrate 3, and the CF substrate 2 on which the draw nozzle 8 has drawn the sealing material 4 from the start edge 7a to the end edge 7b, are bonded to each other so as to form the substrate assembly 9. The cross-sectional view of (h) of FIG. 2 illustrates the two structures 20.

The following describes the substrate assembly cutting process with reference to (g) and (h) of FIG. 2. The substrate assembly 9 illustrated in (g) and (h) of FIG. 2 is scribed by use of a diamond cutter (a scribing cutter or a glass cutter) 10. Specifically, the diamond cutter 10 scribes the CF substrate 2 and the TFT substrate 3 along scribing lines 11 through 13 illustrated in (g) of FIG. 2. Further, the diamond cutter 10 scribes the CF substrate 2 along a CF substrate scribing line 14 illustrated in (g) of FIG. 2, and scribes the TFT substrate 3 along a TFT substrate scribing line 15 illustrated in (g) of FIG. 2. Thereafter, liquid crystal is injected through the liquid crystal inlet 6 into the region 5 surrounded by the sealing material 4, so that the liquid crystal panel 1 illustrated in (a) of FIG. 1 is produced.

A gap d between the edges 4a of the sealing material 4 and the scribing line 12 along which the structures 20 are to be cut is more than 0 μm but not more than 300 μm (see (b) of FIG. 1, that is, the enlarged view of the region surrounded by the alternate long and short dash line A of (a) of FIG. 1). A part which is scribed along the scribing line 12 becomes an edge of the liquid crystal inlet 6 (that is, the B-B' line cross-sectional view of (c) of FIG. 1 illustrates the edge of the liquid crystal inlet 6).

The structures 20 are provided between the CF substrate 2 and the TFT substrate 3, and the structures 20 each are made up of the black matrix BM, the color filter CFR of R (red), the color filter CFG of G (green), the color filter CFB of B (blue), and the alignment film PI, but no sealing material 4 is provided on the alignment film PI (see the B-B' line cross-sectional view of (c) of FIG. 1). The alignment film PI that is the top layer of the structure 20 is in no contact with the TFT substrate 3, and a cavity E1 is formed therebetween.

In the liquid crystal panel 1 of Example 1, the structures 20, each made from the material from which the color filter is formed, are thus provided between the cut surface among the cut surfaces of the liquid crystal panel 1, on which cut surface the liquid crystal inlet 6 is to be formed, and the edges 4a of the sealing material 4 (on the scribing line 12 so as to sandwich the liquid crystal inlet 6), but no sealing material 4 is provided. This decreases change in pressure to be applied by a scribing cutter (cutter) during formation of the liquid crystal inlet 6 (during cutting of the substrate assembly 9), as compared with during production of a conventional liquid crystal panel. Therefore, a defect such as burr and crack can be reduced. That is, the defect such as burr and crack is further unlikely to be caused, or can be reduced in its size.

Example 2

Figure 3:
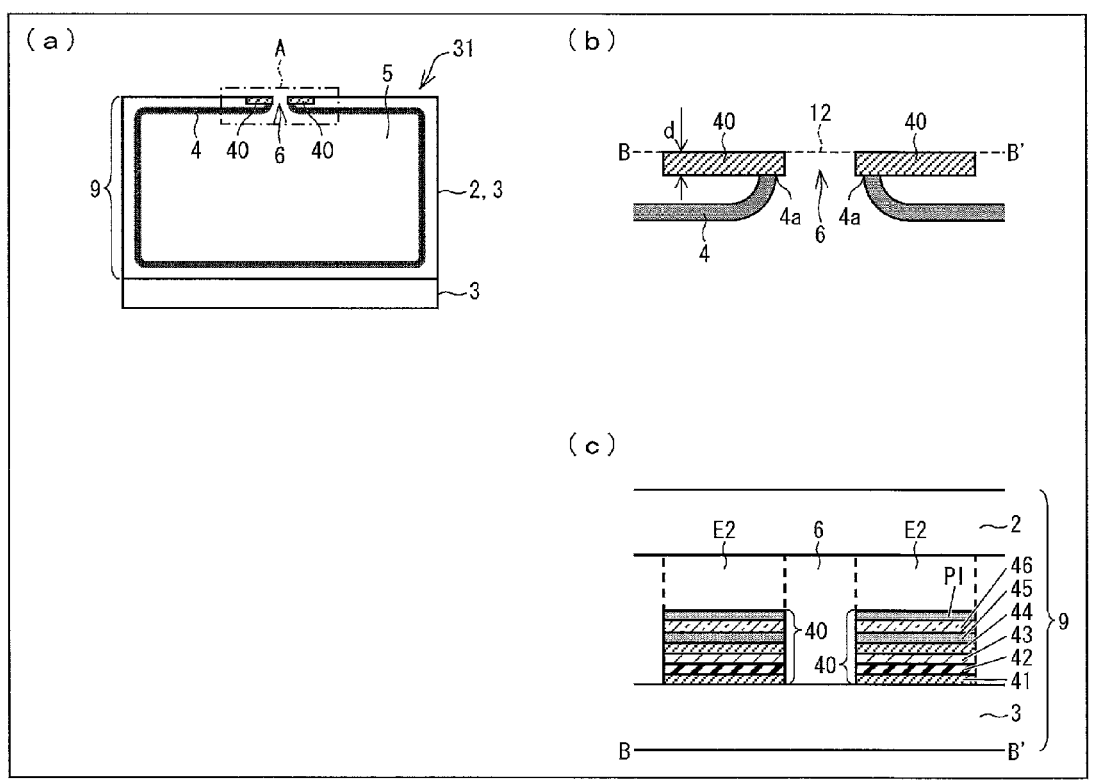
FIG. 3 is an explanatory view of a liquid crystal panel in accordance with another example of the present invention. (a) of FIG. 3 is a plain view illustrating the liquid crystal panel in accordance with another example of the present invention. (b) of FIG. 3 is an enlarged plain view of a region surrounded by an alternate long and short dash line of (a) of FIG. 3. (c) of FIG. 3 is a cross-sectional view taken along B-B' line of (b) of FIG. 3.
Figure 4:
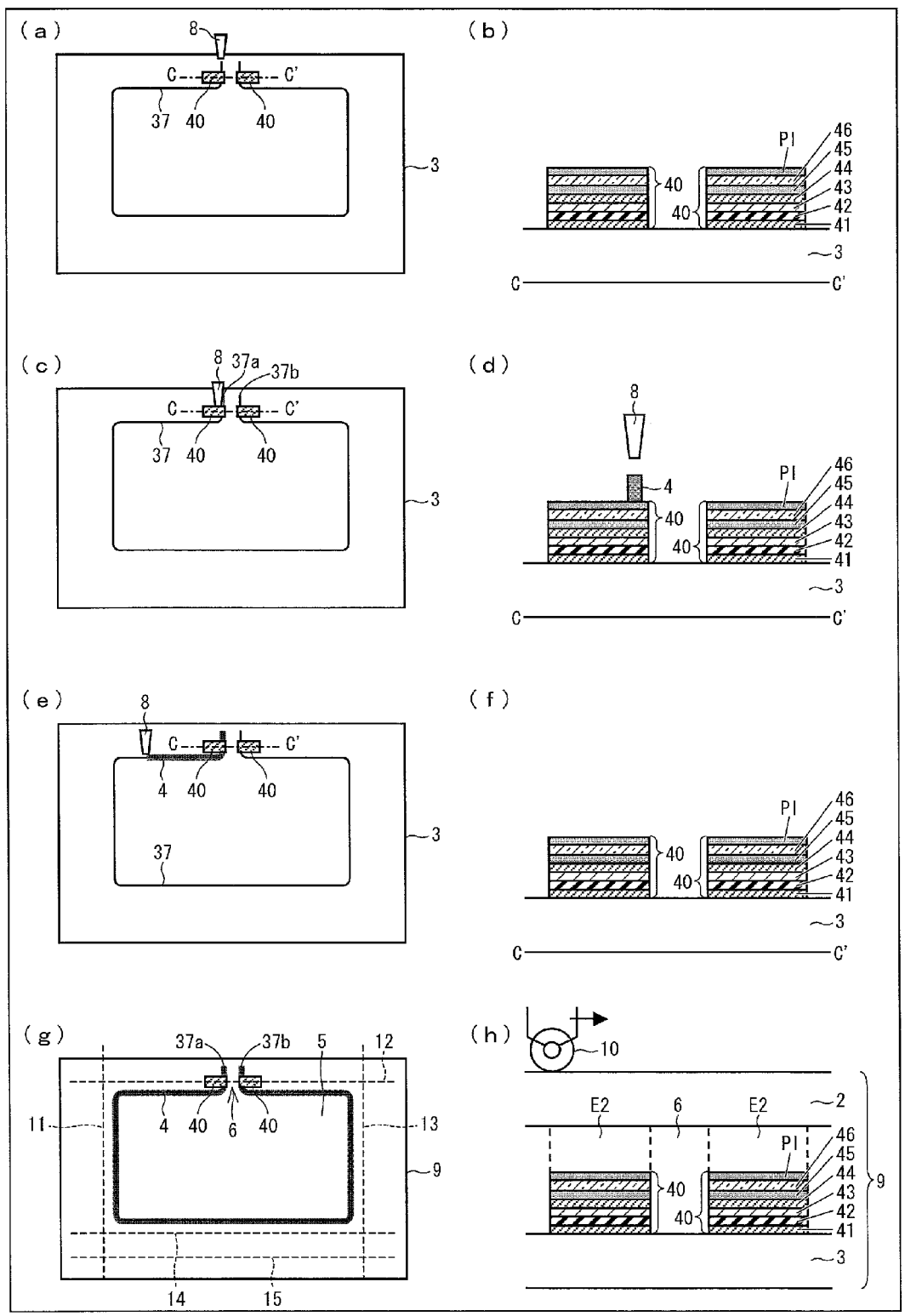
FIG. 4 is an explanatory view of production of a liquid crystal panel in accordance with another example of the present invention. (a) through (h) of FIG. 4 are explanatory views of a process for producing the liquid crystal panel in accordance with another example of the present invention.

The following describes Example 2 of the present invention with reference to FIGS. 3 and 4. Note that configurations other than what is described in Example 2 are identical to those of Example 1. Further, for the sake of easy explanation, like reference numerals herein refer to corresponding members having like functions in the drawings of Example 1, and descriptions of such members are omitted here.

FIG. 3 is an explanatory view of a liquid crystal panel 31 of Example 2. (a) of FIG. 3 is a plain view illustrating the liquid crystal panel 31 of Example 2. (b) of FIG. 3 is an enlarged plain view of a region surrounded by an alternate long and short dash line A of (a) of FIG. 3. (c) of FIG. 3 is a cross-sectional view taken along B-B' line of (b) of FIG. 3.

In the substrate assembly forming process of the process for producing the liquid crystal panel 1 of Example 1, the sealing material draw line 7 and the structures 20 are provided on the CF substrate 2. Meanwhile, in a substrate assembly forming process of a process for producing the liquid crystal panel 31 of Example 2, a sealing material draw line 37 and structures 40 are provided on a TFT substrate 3.

The liquid crystal panel 31 includes (i) a CF substrate 2, made from glass, on which a CF (Color Filter) is to be formed, (ii) a TFT substrate 3, made from glass, on which a TFT (Thin Film Transistor) is to be formed, and (iii) a sealing material (sealant) 4 for sealing liquid crystal injected between the CF substrate 2 and the TFT substrate 3, (iv) a liquid crystal inlet 6 through which the liquid crystal is injected, and (v) the structures 40 provided between a cut surface among cut surfaces of the liquid crystal panel 31, on which cut surface the liquid crystal inlet 6 is to be formed, and edges 4a of the sealing material 4 (see (a) of FIG. 3). The structures 40 have respective surfaces on each of which an alignment film PI is provided. The CF substrate 2 and the TFT substrate 3 constitute a substrate assembly 9 (later described). Liquid crystal is injected through the liquid crystal inlet 6 into a region 5 which is sandwiched between the CF substrate 2 and the TFT substrate 3 and surrounded by the sealing material 4, so that the liquid crystal panel 31 is produced.

The liquid crystal inlet 6 of the liquid crystal panel 31 is formed between the CF substrate 2 and the TFT substrate 3 and between the two structures 40 (see (c) of FIG. 3). A configuration of the structures 40, and a positional relationship between the structures 40 and the liquid crystal inlet 6 will be described later.

A process for producing the liquid crystal panel 31 includes the substrate assembly forming process and a substrate assembly cutting process. The substrate assembly forming process is a process for forming the substrate assembly 9 by bonding the CF substrate 2 and the TFT substrate 3 to each other such that the sealing material 4 is sandwiched between the CF substrate 2 and the TFT substrate 3. The substrate assembly cutting process is a process for scribing (cutting) the substrate assembly 9 in which the CF substrate 2 and the TFT substrate 3 are bonded to each other. First, the substrate assembly forming process will be described below with reference to (a) through (h) of FIG. 4.

FIG. 4 is an explanatory view of production of the liquid crystal panel 31 of Example 2. (a) through (h) of FIG. 4 are explanatory views of a process for producing the liquid crystal panel 31 of Example 2. According to the process illustrated in FIG. 4, the sealing material 4 is drawn (formed) on the TFT substrate 3.

(a) of FIG. 4 is a plain view illustrating the TFT substrate 3 onto which the sealing material 4 is to be drawn. (b) of FIG. 4 is a cross-sectional view taken along C-C' line of (a) of FIG. 4.

The sealing material draw line 37 is formed on the TFT substrate 3 illustrated in (a) of FIG. 4. A draw nozzle (sealing material draw nozzle) 8 draws the sealing material 4 along the sealing material draw line 37. In (a) of FIG. 4, the sealing material 4 has not been drawn yet.

The structures 40, each made from a material from which the thin film transistor is formed, are provided on the TFT substrate 3 (see the C-C' line cross-sectional view of (b) of FIG. 4). More specifically, a gate metal (G metal) 41, a gate insulating film 42, amorphous silicon (a-Si) 43, a source drain metal (SD metal) 44, a protective film 45, a transparent insulating resin 46, and an alignment film PI are accumulated in this order on the TFT substrate 3, but no sealing material 4 is provided on the alignment film PI. The gate insulating film 42 and the protective film 45 each are made from, for example, silicon nitride (SiN).

That is, the structures 40 each includes the gate metal 41, the gate insulating film 42, the amorphous silicon (a-Si) 43, the source drain metal 44, the protective film 45, the transparent insulating resin 46, and the alignment film PI.

(c) of FIG. 4 is a plain view illustrating the TFT substrate 3 onto which the sealing material 4 is being drawn where one of the structures 40 is provided. (d) of FIG. 4 is a cross-sectional view taken along C-C' line of (c) of FIG. 4. The draw nozzle 8 draws the sealing material 4, for example, from a start edge 37a of the sealing material draw line 37 to an end edge 37b of the sealing material draw line 7.

The sealing material 4 is drawn on the alignment film PI of the structure 40 of the left side of the C-C' line cross-sectional view of (d) of FIG. 4. However, the sealing material 4 is repelled from the alignment film PI. Therefore, no sealing material 4 is left on the alignment film PI (see (f) of FIG. 4).

(e) of FIG. 4 is a plain view illustrating the TFT substrate 3 on which the sealing material 4 is being drawn along a part of the sealing material draw line 37, which part follows the structure 40. (f) of FIG. 4 is a cross-sectional view taken along C-C' line of (e) of FIG. 4. No sealing material 4 is left on the alignment film PI in the C-C' line cross-sectional view of (f) of FIG. 4, because of the above-described reason.

(g) of FIG. 4 is a plain view illustrating the substrate assembly 9 in which the TFT substrate 3 on which the sealing material 4 has been drawn, and the CF substrate 2 are bonded to each other. (h) of FIG. 4 is a cross-sectional view taken along a scribing line 12 of (g) of FIG. 4. The CF substrate 2, and the TFT substrate 3 on which the draw nozzle 8 has drawn the sealing material 4 from the start edge 37a to the end edge 37b, are bonded to each other so as to form the substrate assembly 9. The cross-sectional view of (h) of FIG. 4 illustrates the two structures 40.

The following describes the substrate assembly cutting process with reference to (g) and (h) of FIG. 4. The substrate assembly 9 illustrated in (g) and (h) of FIG. 4 is scribed by use of a diamond cutter (a scribing cutter or a glass cutter) 10. Specifically, the diamond cutter 10 scribes the CF substrate 2 and the TFT substrate 3 along scribing lines 11 through 13 illustrated in (g) of FIG. 4. Further, the diamond cutter 10 scribes the CF substrate 2 along a CF substrate scribing line 14 illustrated in (g) of FIG. 4, and scribes the TFT substrate 3 along a TFT substrate scribing line 15 illustrated in (g) of FIG. 4. Thereafter, liquid crystal is injected through the liquid crystal inlet 6 into the region 5 surrounded by the sealing material 4, so that the liquid crystal panel 31 illustrated in (a) of FIG. 3 is produced.

A gap d between the edges 4a of the sealing material 4 and the scribing line 12 along which the structures 20 are to be cut is more than 0 μm but not more than 300 μm (see (b) of FIG. 3, that is, the enlarged view of the region surrounded by the alternate long and short dash line A of (a) of FIG. 3). A part which is scribed along the scribing line 12 becomes an edge of the liquid crystal inlet 6 (that is, the B-B' line cross-sectional view of (c) of FIG. 3 illustrates the edge of the liquid crystal inlet 6).

The structures 40 are provided between the CF substrate 2 and the TFT substrate 3, and the structures 40 each are made up of the gate metal 41, the gate insulating film 42, the amorphous silicon (a-Si) 43, the source drain metal 44, the protective film 45, the transparent insulating resin 46, and the alignment film PI, but no sealing material 4 is provided on the alignment film PI (see the B-B' line cross-sectional view of (c) of FIG. 3). The alignment film PI that is the top layer of the structure 40 is in no contact with the CF substrate 2, and a cavity E2 is formed therebetween.

According to the process for producing the liquid crystal panel 31 of Example 2, the structures 40, each made from the material from which the thin film transistor is formed, are thus provided between the cut surface among the cut surfaces of the liquid crystal panel 31, on which cut surface the liquid crystal inlet 6 is to be formed, and the edges 4a of the sealing material 4 (on the scribing line 12 so as to sandwich the liquid crystal inlet 6), but no sealing material 4 is provided on the structures 40. This decreases change in pressure to be applied by a scribing cutter during formation of the liquid crystal inlet 6, as compared with during production of a conventional liquid crystal panel. Therefore, a defect such as burr and crack can be reduced. That is, the defect such as burr and crack is further unlikely to be caused, or can be reduced in its size.

Example 3

Figure 5:
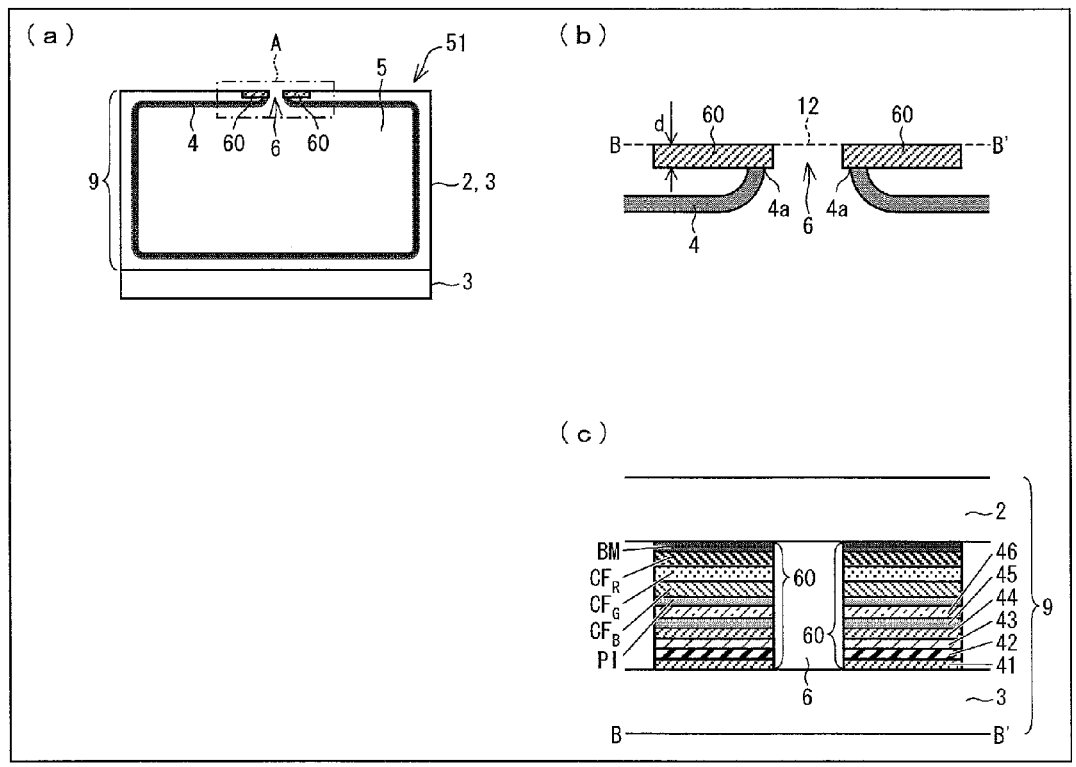
FIG. 5 is an explanatory view of production of a liquid crystal panel in accordance with yet another example of the present invention. (a) of FIG. 5 is a plain view illustrating the liquid crystal panel in accordance with yet another example of the present invention. (b) of FIG. 5 is an enlarged plain view of a region surrounded by an alternate long and short dash line of (a) of FIG. 5. (c) of FIG. 5 is a cross-sectional view taken along B-B' line of (b) of FIG. 5.
Figure 6:
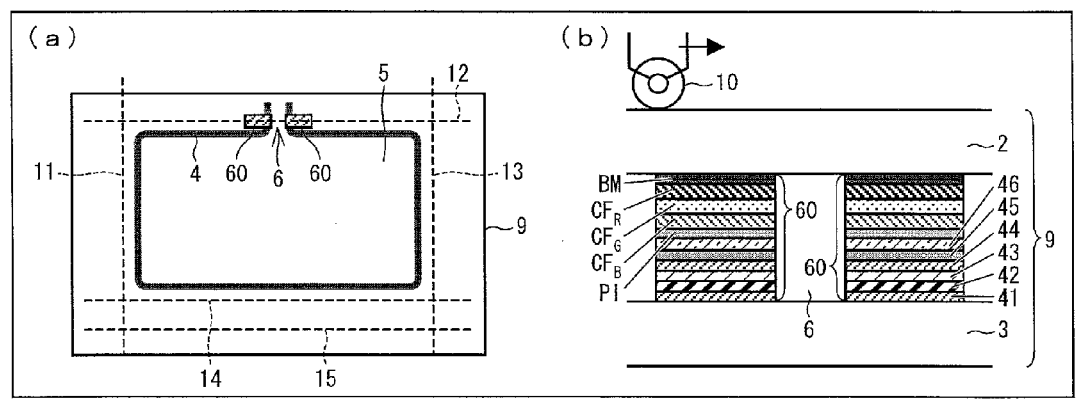
FIG. 6 is an explanatory view of cutting of a substrate assembly. (a) and (b) of FIG. 6 are explanatory views of a process for cutting a substrate assembly of a liquid crystal panel in accordance with yet another example of the present invention.

The following describes Example 3 of the present invention with reference to FIGS. 5 and 6. Note that configurations other than what is described in Example 3 are identical to those of Examples 1 and 2. Further, for the sake of easy explanation, like reference numerals herein refer to corresponding members having like functions in the drawings of Examples 1 and 2, and descriptions of such members are omitted here.

FIG. 5 is an explanatory view of production of a liquid crystal panel 51 of Example 3. (a) of FIG. 5 is a plain view illustrating the liquid crystal panel 51 of Example 3. (b) of FIG. 5 is an enlarged plain view of a region surrounded by an alternate long and short dash line A of (a) of FIG. 5. (c) of FIG. 5 is a cross-sectional view taken along B-B' line of (b) of FIG. 5.

The liquid crystal panel 51 of Example 3 includes structures 60 in each of which the structure 20 of the liquid crystal panel 1 of Example 1 and the structure 40 of the liquid crystal panel 31 of Example 3 are accumulated. In the structure 60, the structure 20 shares the alignment film PI with the structure 40. According to the configuration, the cavities described in respective Examples 1 and 2, that is, neither the cavity E1 nor the cavity E2 is formed between the two structures 60 and a CF substrate 3 (or a TFT substrate 3).

The liquid crystal panel 51 includes (i) a CF substrate 2, made from glass, on which a CF (Color Filter) is to be formed, (ii) a TFT substrate 3, made from glass, on which a TFT (Thin Film Transistor) is to be formed, and (iii) a sealing material (sealant) 4 for sealing liquid crystal injected between the CF substrate 2 and the TFT substrate 3, (iv) a liquid crystal inlet 6 through which the liquid crystal is injected, and (v) the structures 60 provided between a cut surface among cut surfaces of the liquid crystal panel 51, on which cut surface the liquid crystal inlet 6 is to be formed, and edges 4a of the sealing material 4 (see (a) of FIG. 5). The CF substrate 2 and the TFT substrate 3 constitute a substrate assembly 9 (later described). Liquid crystal is injected through the liquid crystal inlet 6 into a region 5 which is sandwiched between the CF substrate 2 and the TFT substrate 3 and surrounded by the sealing material 4, so that the liquid crystal panel 51 is produced.

The liquid crystal inlet 6 of the liquid crystal panel 51 is formed between the CF substrate 2 and the TFT substrate 3 and between the two structures 60 (see (c) of FIG. 5). A configuration of the structures 60, and a positional relationship between the structures 60 and the liquid crystal inlet 6 will be described later.

A process for producing the liquid crystal panel 51 includes a substrate assembly forming process and a substrate assembly cutting process. The substrate assembly forming process is a process for forming the substrate assembly 9 by bonding the CF substrate 2 and the TFT substrate 3 to each other such that the sealing material 4 is sandwiched between the CF substrate 2 and the TFT substrate 3. The substrate assembly cutting process is a process for scribing (cutting) the substrate assembly 9 in which the CF substrate 2 and the TFT substrate 3 are bonded to each other.

In the substrate assembly forming process of the process for producing the liquid crystal panel 51, the structures 20 are formed on the CF substrate 2 (see (a) through (f) of FIG. 2), and the structures 40 are formed on the TFT substrate 3 (see (a) through (f) of FIG. 4). Note that the structures 20 can be formed earlier than the structures 40, and vice versa.

In each of the structures 60, the structure 20 thus shares the alignment film PI with the structure 40. Therefore, one of the alignment film PI of the structure 20 and the alignment film PI of the structure 40 can be removed after drawing of the sealing material 4.

The CF substrate 2 on which the structures 20 are formed, and the TFT substrate 3 on which the structures 40 are formed, are bonded to each other so as to form the substrate assembly 9 illustrated in (a) of FIG. 6.

The following describes the substrate assembly cutting process with reference to (a) and (b) of FIG. 6. FIG. 6 is an explanatory view of cutting of the substrate assembly 9. The substrate assembly 9 illustrated in (a) and (b) of FIG. 6 is scribed by use of a diamond cutter (a scribing cutter or a glass cutter) 10. Specifically, the diamond cutter 10 scribes the CF substrate 2 and the TFT substrate 3 along scribing lines 11 through 13 illustrated in (a) of FIG. 6. Further, the diamond cutter 10 scribes the CF substrate 2 along a CF substrate scribing line 14 illustrated in (a) of FIG. 6, and scribes the TFT substrate 3 along a TFT substrate scribing line 15 illustrated in (a) of FIG. 6. Thereafter, liquid crystal is injected through the liquid crystal inlet 6 into the region 5 surrounded by the sealing material 4, so that the liquid crystal panel 51 illustrated in (a) of FIG. 5 is produced.

A gap d between the edges 4a of the sealing material 4 and the scribing line 12 along which the structures 60 are to be cut is more than 0 μm but not more than 300 μm (see (b) of FIG. 5, that is, the enlarged view of the region surrounded by the alternate long and short dash line A of (a) of FIG. 5). A part which is scribed along the scribing line 12 becomes an edge of the liquid crystal inlet 6 (that is, the B-B' line cross-sectional view of (c) of FIG. 5 illustrates the edge of the liquid crystal inlet 6).

The structures 60 are provided between the CF substrate 2 and the TFT substrate 3. In each of the structures 60, a black matrix BM, a color filter CFR of R (red), a color filter CFG of G (green), a color filter CFB of B (blue), an alignment film PI, a transparent insulating resin 46, a protective film 45, a source drain metal 44, amorphous silicon (a-Si) 43, a gate insulating film 42, and a gate metal 41 are accumulated in this order, but no sealing material 4 is provided (see the B-B' line cross-sectional view of (c) of FIG. 5).

According to the process for producing the liquid crystal panel 51 of Example 3, the structures 60 are thus provided between the cut surface among the cut surfaces of the liquid crystal panel 51, on which cut surface the liquid crystal inlet 6 is to be formed, and the edges 4a of the sealing material 4 (on the scribing line 12 so as to sandwich the liquid crystal inlet 6). The structures 60 each are made from the material from which the color filter is formed and the material from which the thin film transistor is formed, but no sealing material 4 is provided on the structures 60. This decreases change in pressure to be applied by a scribing cutter during formation of the liquid crystal inlet 6, as compared with during production of a conventional liquid crystal panel. Therefore, a defect such as burr and crack can be reduced. That is, the defect such as burr and crack is further unlikely to be caused, or can be reduced in its size.

Example 4

Figure 7:
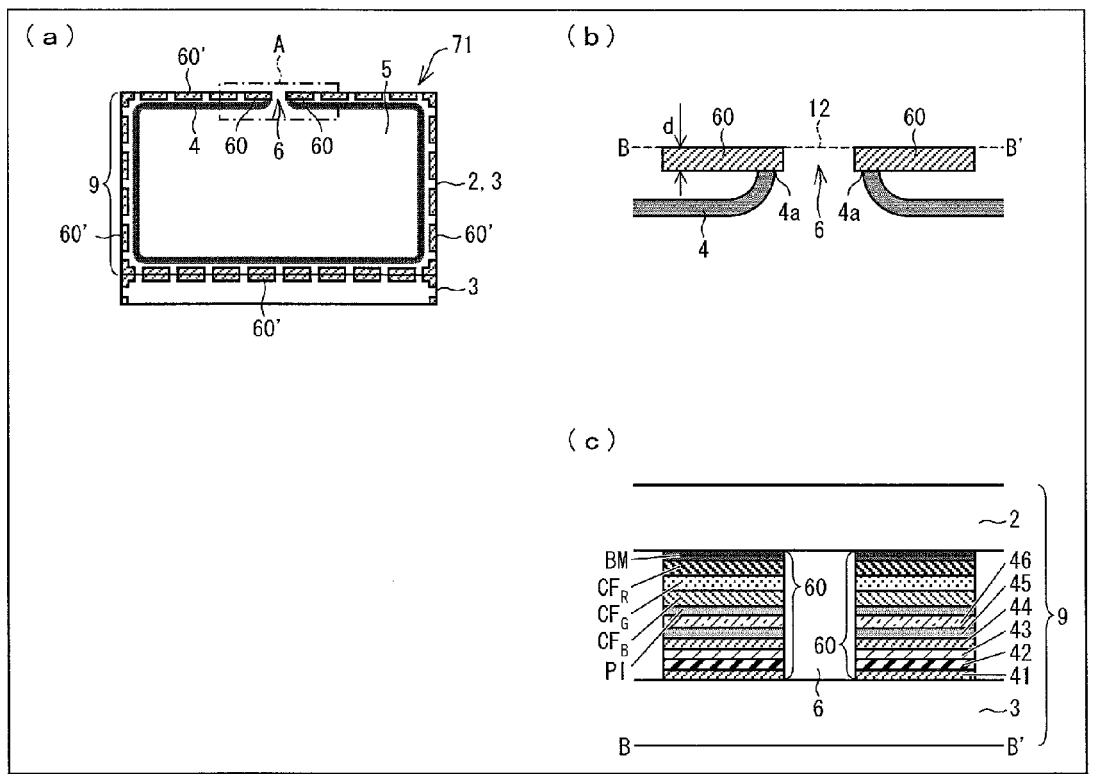
FIG. 7 is an explanatory view of production of a liquid crystal panel in accordance with yet another example of the present invention. (a) of FIG. 7 is a plain view illustrating the liquid crystal panel in accordance with yet another example of the present invention. (b) of FIG. 7 is an enlarged plain view of a region surrounded by an alternate long and short dash line of (a) of FIG. 7. (c) of FIG. 7 is a cross-sectional view taken along B-B' line of (b) of FIG. 7.
Figure 8:
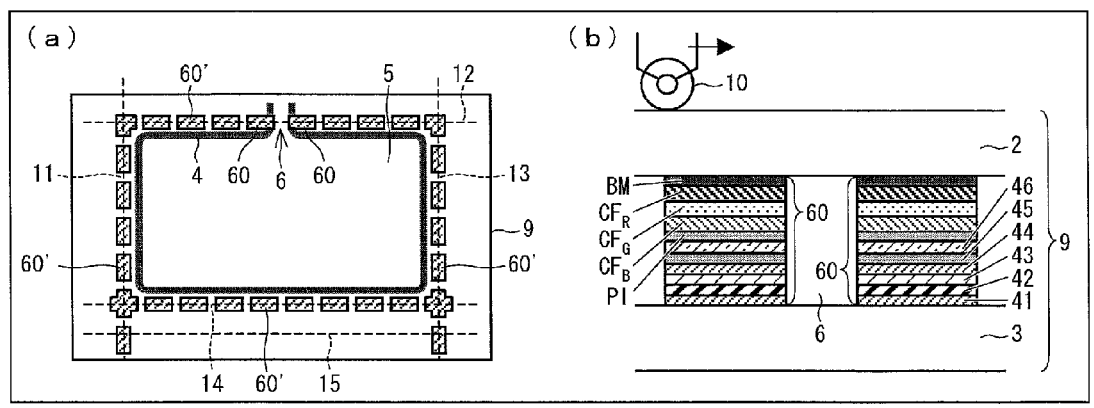
FIG. 8 is an explanatory view of cutting of a substrate assembly. (a) and (b) of FIG. 8 are explanatory views of a process for cutting a substrate assembly of a liquid crystal panel in accordance with yet another example of the present invention.

The following describes Example 4 of the present invention with reference to FIGS. 7 and 8. Note that configurations other than what is described in Example 4 are identical to those of Examples 1 through 3. Further, for the sake of easy explanation, like reference numerals herein refer to corresponding members having like functions in the drawings of Examples 1 through 3, and descriptions of such members are omitted here.

FIG. 7 is an explanatory view of production of a liquid crystal panel 71 of Example 4. (a) of FIG. 7 is a plain view illustrating the liquid crystal panel 71 of Example 4. (b) of FIG. 7 is an enlarged plain view of a region surrounded by an alternate long and short dash line A of (a) of FIG. 7. (c) of FIG. 7 is a cross-sectional view taken along B-B' line of (b) of FIG. 7.

The liquid crystal panel 71 of Example 4 includes the structures 60 of the liquid crystal panel 51 of Example 3, and structures 60' (second structures). The structures 60' are identical in configuration to the structures 60 but different in where to be provided from the structures 60. That is, the structures 60' are provided where no liquid crystal inlet 6 is formed, for example, along a periphery of a CF substrate 2 or a TFT substrate 3, whereas the structures 60 are provided where the liquid crystal inlet 6 is formed. Alternatively, the structures 60' are provided on scribing lines (such as CF substrate/TFT substrate scribing lines 11 through 13) along which a substrate assembly 9 is scribed.

The liquid crystal panel 71 includes (i) a CF substrate 2, made from glass, on which a CF (Color Filter) is to be formed, (ii) a TFT substrate 3, made from glass, on which a TFT (Thin Film Transistor) is to be formed, and (iii) a sealing material (sealant) 4 for sealing liquid crystal injected between the CF substrate 2 and the TFT substrate 3, (iv) a liquid crystal inlet through which the liquid crystal is injected, (v) the structures 60 provided between a cut surface among cut surfaces of the liquid crystal panel 71, on which cut surface the liquid crystal inlet 6 is to be formed, and edges 4a of the sealing material 4, and (vi) the structures 60' (see (a) of FIG. 7). The CF substrate 2 and the TFT substrate 3 constitute the substrate assembly 9 (later described). Liquid crystal is injected through the liquid crystal inlet 6 into a region 5 which is sandwiched between the CF substrate 2 and the TFT substrate 3 and surrounded by the sealing material 4, so that the liquid crystal panel 71 is produced.

The liquid crystal inlet 6 of the liquid crystal panel 71 is formed between the CF substrate 2 and the TFT substrate 3 and between the two structures 60 (see (c) of FIG. 7).

A process for producing the liquid crystal panel 71 includes a substrate assembly forming process and a substrate assembly cutting process. The substrate assembly forming process is a process for forming the substrate assembly 9 by bonding the CF substrate 2 and the TFT substrate 3 to each other such that the sealing material 4 is sandwiched between the CF substrate 2 and the TFT substrate 3. The substrate assembly cutting process is a process for scribing (cutting) the substrate assembly 9 in which the CF substrate 2 and the TFT substrate 3 are bonded to each other.

In the substrate assembly forming process of the process for producing the liquid crystal panel 71, the structures 20 illustrated in (a) through (f) of FIG. 2 are provided, and structures having a configuration identical to that of the structures 20 are provided on the scribing lines 11 through 13. Further, the structures 40 illustrated in (a) through (f) of FIG. 4 are provided, and structures having a configuration identical to that of the structures 40 are provided on the scribing lines 11 through 13.

Note that the structures 20, and the structures having the configuration identical to that of the structures 20 can be provided earlier than the structures 40, and the structures having the configuration identical to that of the structures 40, and vice versa.

In each of the structures 60, the structure 20 thus shares the alignment film PI with the structure 40. Further, in each of the structures 60', the structure having the configuration identical to that of the structures 20 shares the alignment film PI with the structure having the configuration identical to that of the structures 40.

Therefore, one of the alignment film PI of the structure 20 and the alignment film PI of the structure 40 can be removed after drawing of the sealing material 4. Further, one of (i) the alignment film PI of the structure having the configuration identical to that of the structures 20 and (ii) the alignment film PI of the structure having the configuration identical to that of the structures 40 can be removed after drawing of the sealing material 4.

The CF substrate 2 on which the structures 20 and the structures having the configuration identical to that of the structures 20 are formed, and the TFT substrate 3 on which the structures 40 and the structures having the configuration identical to that of the structures 40 are formed, are bonded to each other so as to form the substrate assembly 9 illustrated in (a) of FIG. 8.

The following describes the substrate assembly cutting process with reference to (a) and (b) of FIG. 8. FIG. 8 is an explanatory view of cutting of the substrate assembly 9. The substrate assembly 9 illustrated in (a) and (b) of FIG. 8 is scribed by use of a diamond cutter (a scribing cutter or a glass cutter) 10. Specifically, the diamond cutter 10 scribes the CF substrate 2 and the TFT substrate 3 along scribing lines 11 through 13 illustrated in (a) of FIG. 6. Further, the diamond cutter 10 scribes the CF substrate 2 along a CF substrate scribing line 14 illustrated in (a) of FIG. 8, and scribes the TFT substrate 3 along a TFT substrate scribing line 15 illustrated in (a) of FIG. 8. Thereafter, liquid crystal is injected through a liquid crystal inlet 6 into a region 5 surrounded by the sealing material 4, so that the liquid crystal panel 71 illustrated in (a) of FIG. 7 is produced.

A gap d between the edges 4a of the sealing material 4 and the scribing line 12 along which the structures 60 are to be cut is more than 0 µm but not more than 300 µm (see (b) of FIG. 7, that is, the enlarged view of the region surrounded by the alternate long and short dash line A of (a) of FIG. 7). A part which is scribed along the scribing line 12 becomes an edge of the liquid crystal inlet 6 (that is, the B-B' line cross-sectional view of (c) of FIG. 7 illustrates the edge of the liquid crystal inlet 6).

The structures 60 are provided between the CF substrate 2 and the TFT substrate 3. In each of the structures 60, a black matrix BM, a color filter CFR of R (red), a color filter CFG of G (green), a color filter CFB of B (blue), an alignment film PI, a transparent insulating resin 46, a protective film 45, a source drain metal 44, amorphous silicon (a-Si) 43, a gate insulating film 42, and a gate metal 41 are accumulated in this order, but no sealing material 4 is provided on the structures 60 (see the B-B' line cross-sectional view of (c) of FIG. 7).

According to the process for producing the liquid crystal panel 71 of Example 4, the structures 60 are thus provided between the cut surface among the cut surfaces of the liquid crystal panel 71, on which cut surface the liquid crystal inlet 6 is to be formed, and the edges 4a of the sealing material 4 (on the scribing line 12 so as to sandwich the liquid crystal inlet 6). Further, the structures 60' are provided on the scribing lines 11 through 13.

The structures 60 and the structures 60' each are made from the material from which the color filter is formed and the material from which the thin film transistor is formed, but no sealing material 4 is provided on the two structures 60 and the structures 60'. This decreases change in pressure to be applied by a scribing cutter during formation of the liquid crystal inlet 6, as compared with during production of a conventional liquid crystal panel. Therefore, a defect such as burr and crack can be reduced. That is, the defect such as burr and crack is further unlikely to be caused, or can be reduced in its size.

Example 5

Figure 9:
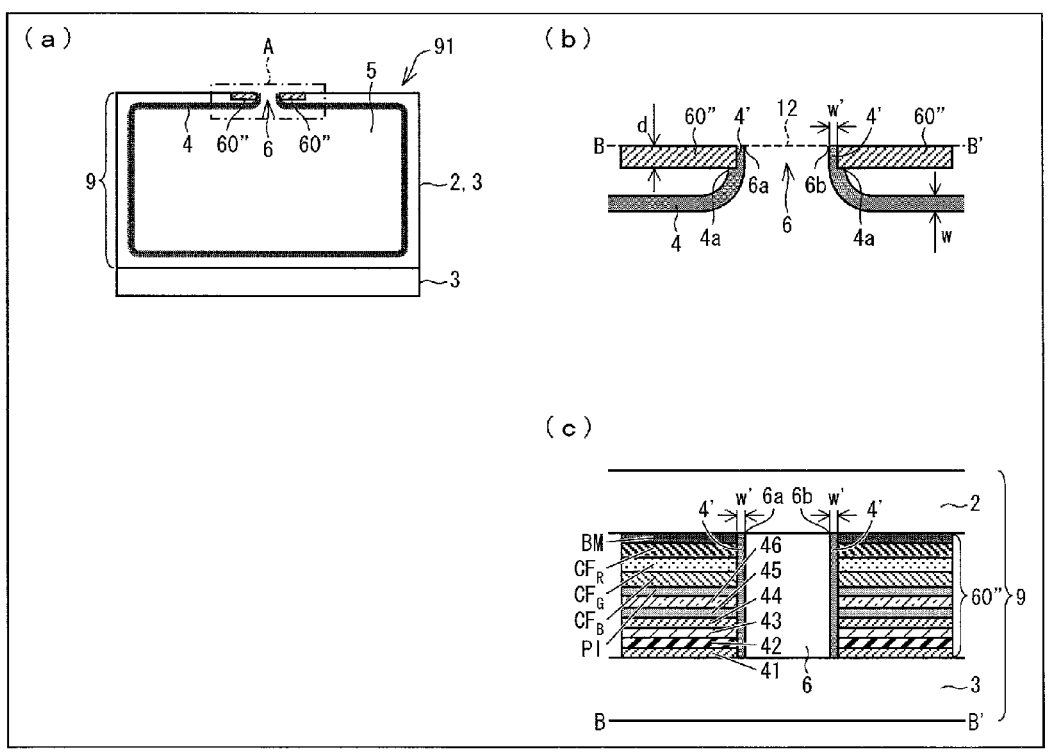
FIG. 9 is an explanatory view of production of a liquid crystal panel in accordance with yet another example of the present invention. (a) of FIG. 9 is a plain view illustrating the liquid crystal panel in accordance with yet another example of the present invention. (b) of FIG. 9 is an enlarged plain view of a region surrounded by an alternate long and short dash line of (a) of FIG. 9. (c) of FIG. 9 is a cross-sectional view taken along B-B' line of (b) of FIG. 9.
Figure 10:
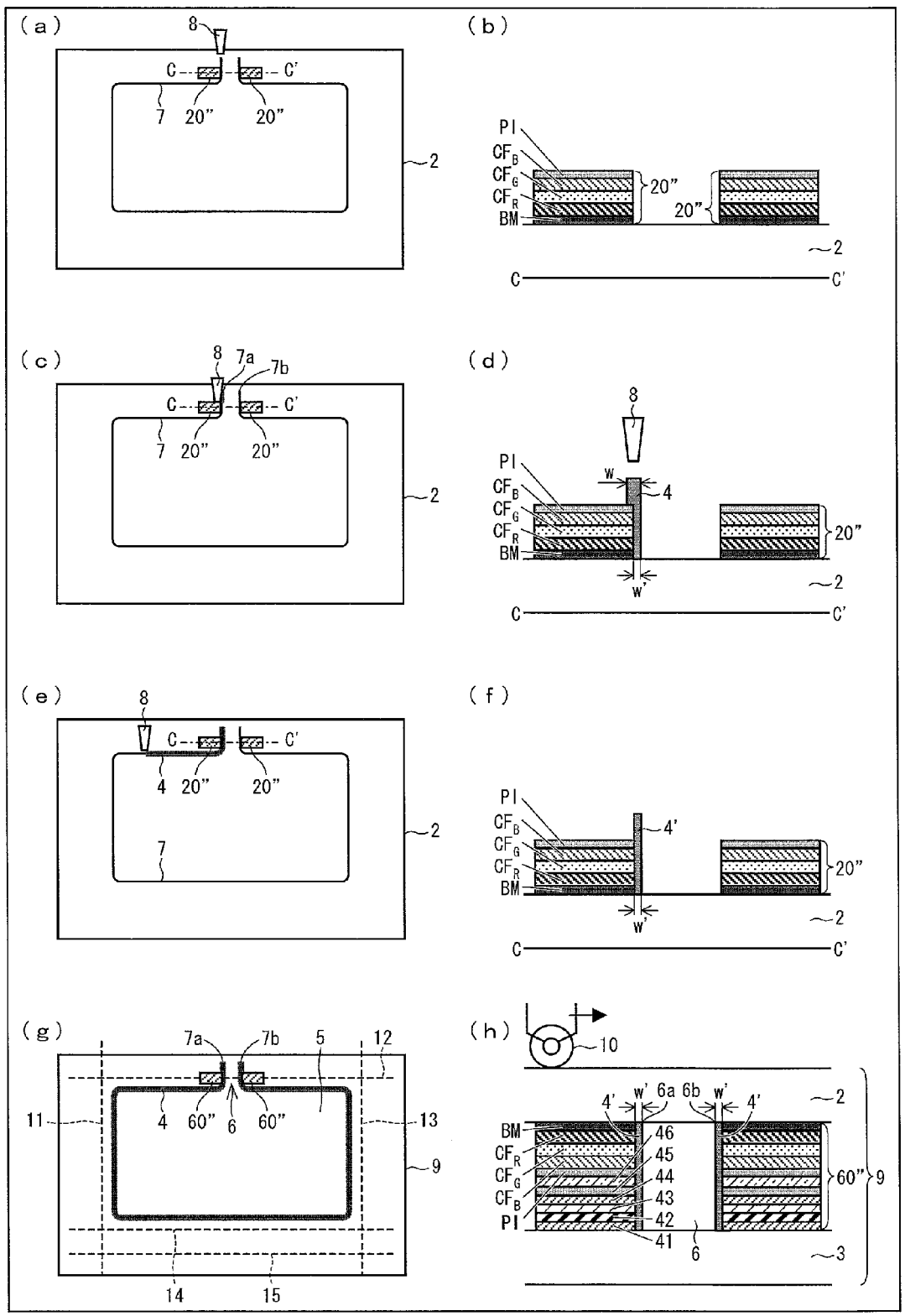
FIG. 10 is an explanatory view of production of a liquid crystal panel in accordance with yet another example of the present invention. (a) through (h) of FIG. 10 are explanatory views of a process for producing the liquid crystal panel in accordance with yet another example of the present invention.
Figure 11:
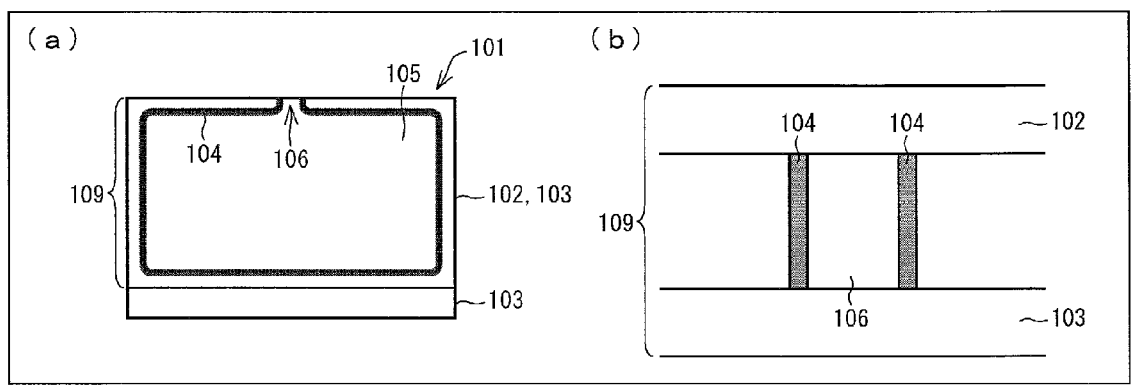
FIG. 11 is an explanatory view of a convention liquid crystal panel. (a) of FIG. 11 is a plain view illustrating the conventional liquid crystal panel to be used in a liquid crystal display device. (b) of FIG. 11 is a cross-sectional view illustrating a liquid crystal inlet of the conventional liquid crystal panel.
Figure 12:
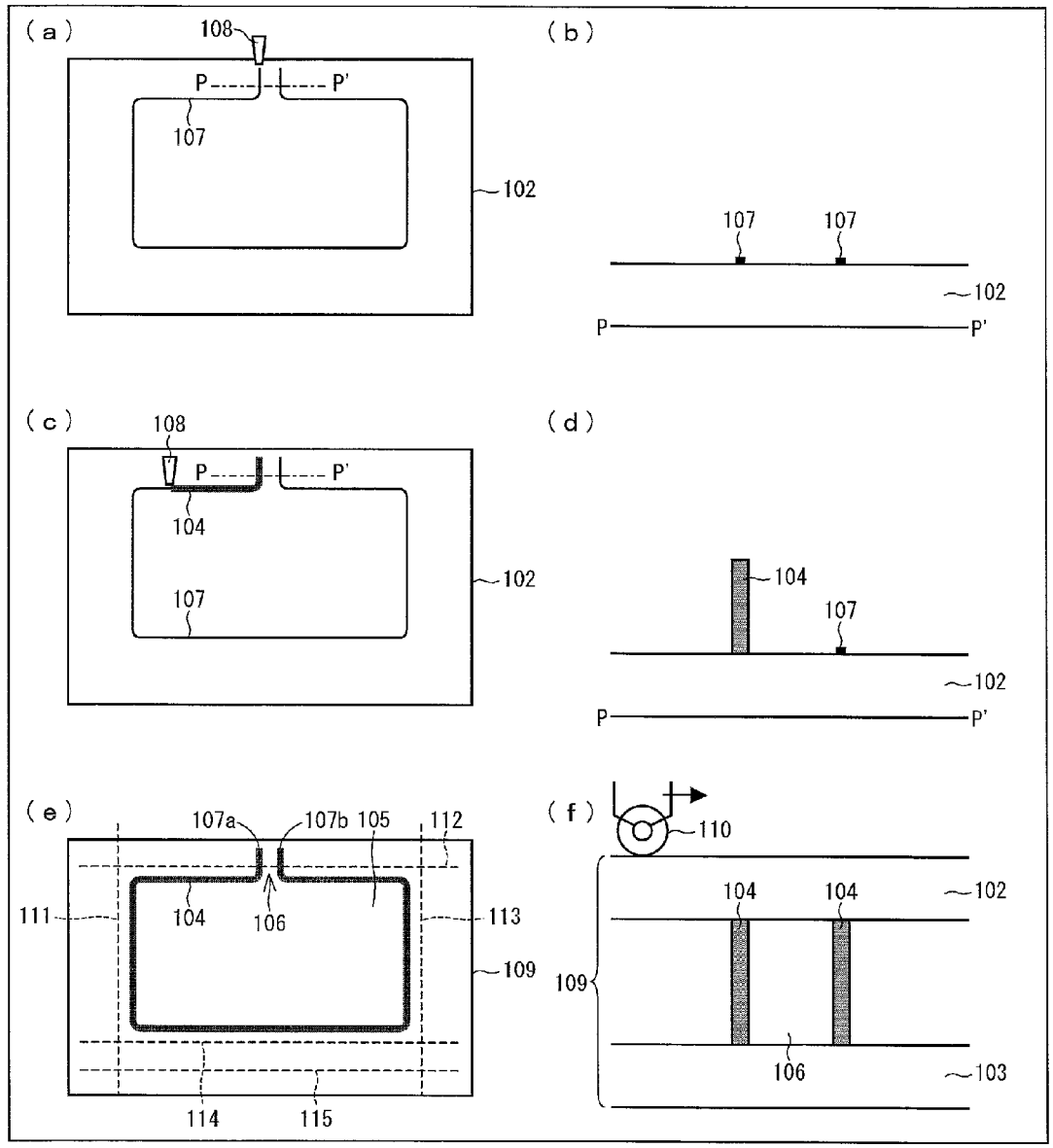
FIG. 12 is an explanatory view of production of a conventional liquid crystal panel. (a) through (f) of FIG. 12 are explanatory views of a process for producing the conventional liquid crystal panel.
Figure 13:
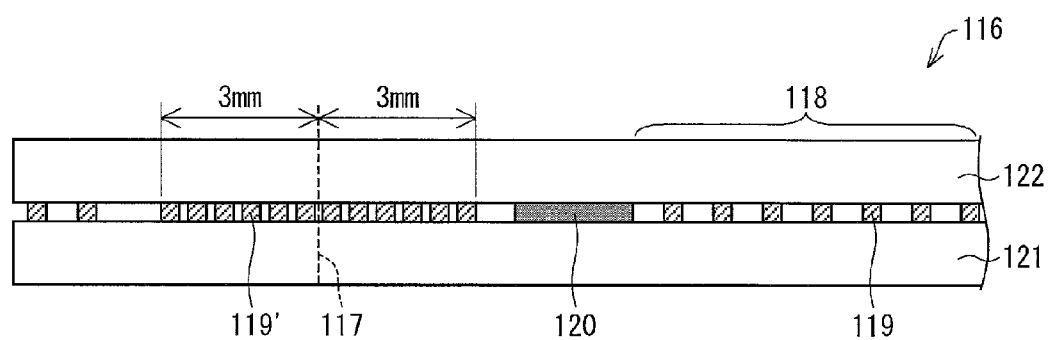
FIG. 13 corresponds to FIG. 4 of Patent Literature 1, and is a cross-sectional view illustrating a liquid crystal display panel of Patent Literature 1.
Figure 14:
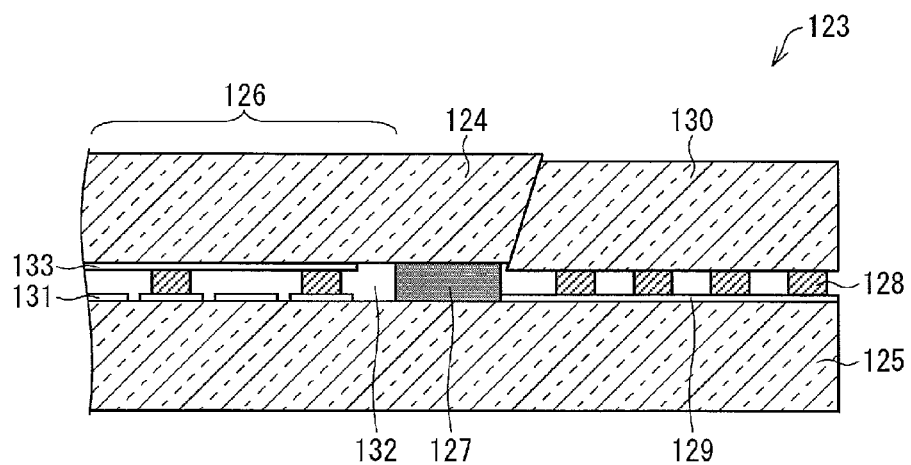
FIG. 14 corresponds to FIG. 1 of Patent Literature 2, and is a cross-sectional view illustrating a liquid crystal display element of Patent Literature 2.
Figure 15:
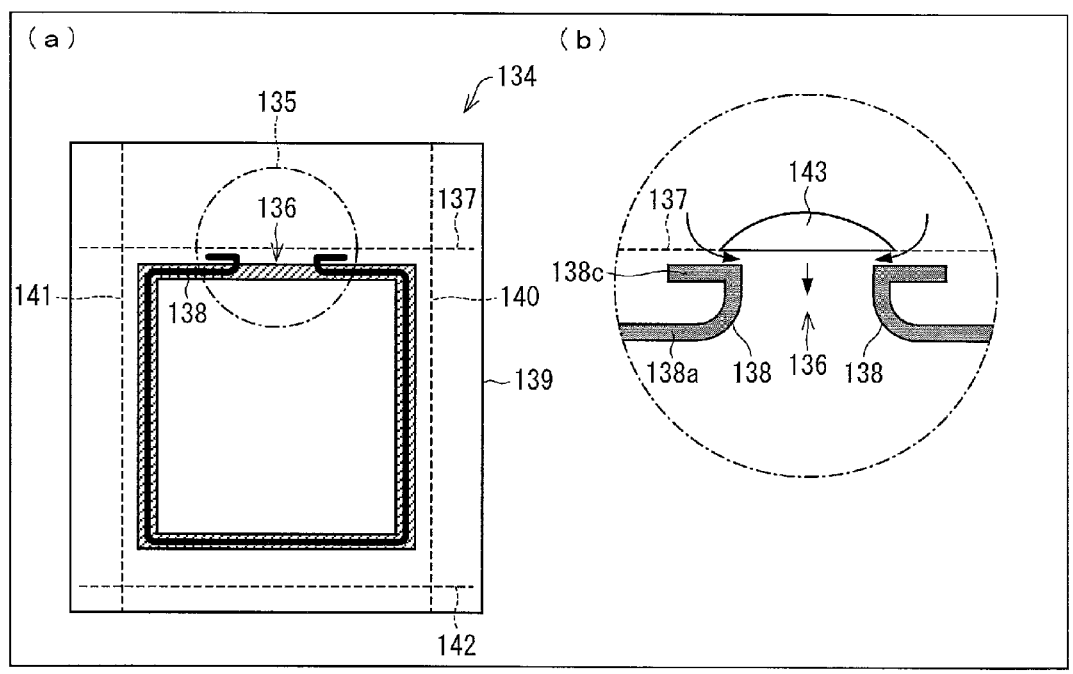
FIG. 15 is an explanatory view of a liquid crystal display device panel of Patent Literature 3. (a) of FIG. 15 corresponds to FIG. 5 of Patent Literature 3, and is a view illustrating the liquid crystal display device panel of Patent Literature 3. (b) of FIG. 15 corresponds to FIG. 6 of Patent Literature 3, and is an enlarged view of a part circled by a circle of (a) of FIG. 15.
Figure 16:
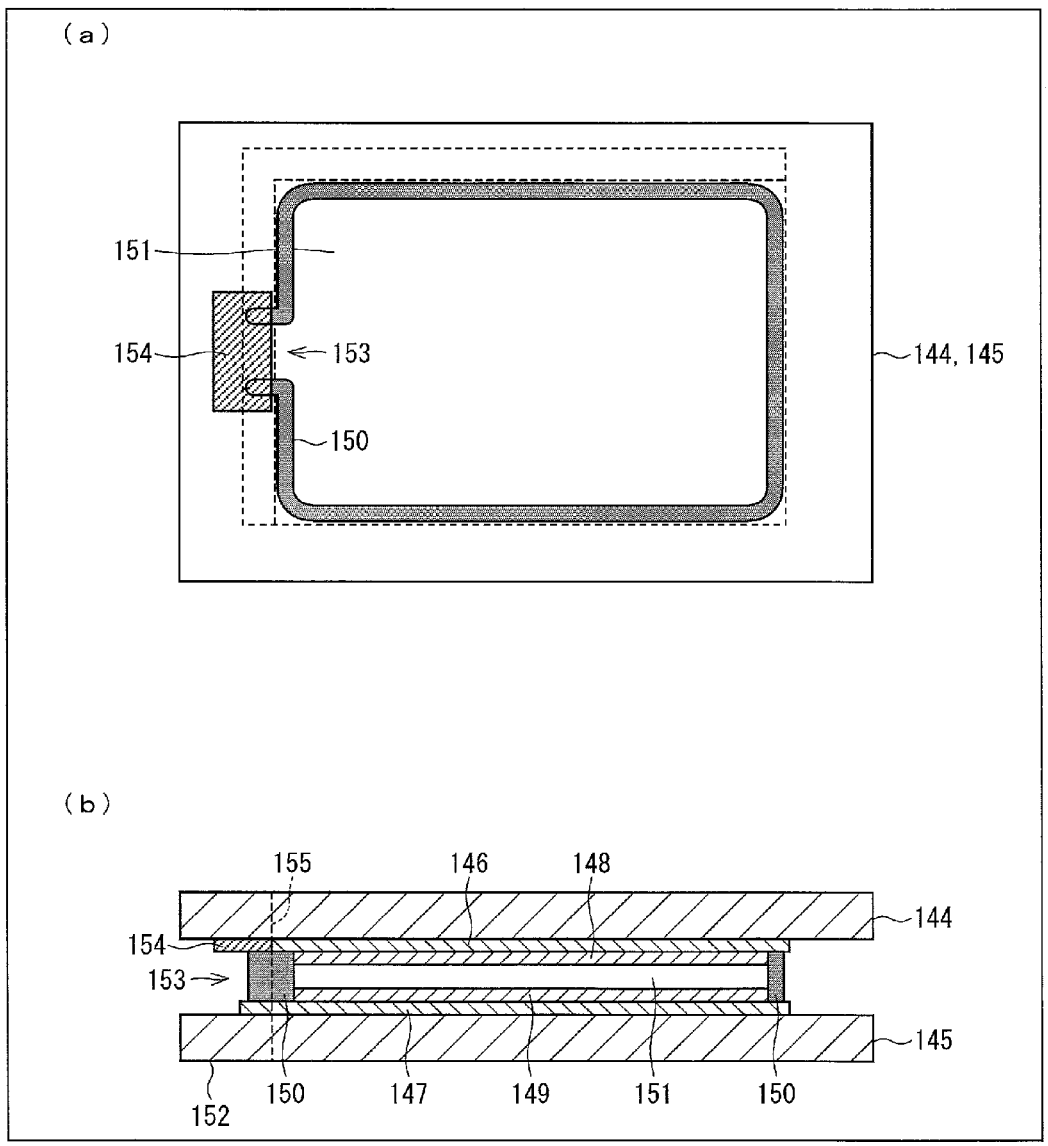
FIG. 16 is an explanatory view of a liquid crystal display device of Patent Literature 4. (a) of FIG. 16 corresponds to FIG. 1(a) of Patent Literature 4, and is a plain view illustrating the liquid crystal display device of Patent Literature 4. (b) of FIG. 16 corresponds to FIG. 1(b) of Patent Literature 4, and is a cross-sectional view illustrating the liquid crystal display device of Patent Literature 4.

The following describes Example 5 of the present invention with reference to FIGS. 9 and 10. Note that configurations other than what is described in Example 5 are identical to those of Examples 1 through 4. Further, for the sake of easy explanation, like reference numerals herein refer to corresponding members having like functions in the drawings of Examples 1 through 4, and descriptions of such members are omitted here.

FIG. 9 is an explanatory view of production of a liquid crystal panel 91 of Example 5. (a) of FIG. 9 is a plain view illustrating the liquid crystal panel 91 of Example 5. (b) of FIG. 9 is an enlarged plain view of a region surrounded by an alternate long and short dash line A of (a) of FIG. 9. (c) of FIG. 9 is a cross-sectional view taken along B-B' line of (b) of FIG. 9.

The liquid crystal panel 91 of Example 5 includes structures 60" identical in configuration to the structures 60. In the liquid crystal panel 91, sealing materials 4' (second sealants) are provided between a cut surface among cut surfaces of the liquid crystal panel 91, on which cut surface a liquid crystal inlet 6 is to be formed, and edges 4a of a sealing material 4, whereas, in the liquid crystal panel 51, no sealing material 4 is provided between the cut surface among the cut surfaces of the liquid crystal panel 51, on which cut surface the liquid crystal inlet 6 is to be formed, and the edges 4a of the sealing material 4. W'<W where W represents a width of a sealing material 4, and W' represents a width of a sealing material 4'. That is, the width W' of the sealing material 4' is smaller than the width W of the sealing material 4.

The liquid crystal panel 91 includes (i) a CF substrate 2, made from glass, on which a CF (Color Filter) is to be formed, (ii) a TFT substrate 3, made from glass, on which a TFT (Thin Film Transistor) is to be formed, and (iii) a sealing material (sealant) 4 for sealing liquid crystal injected between the CF substrate 2 and the TFT substrate 3, (iv) a liquid crystal inlet 6 through which the liquid crystal is injected, (v) the sealing materials 4', each having a width smaller than that of the sealing material 4, which are provided between the cut surface among the cut surfaces of the liquid crystal panel 91, on which cut surface the liquid crystal inlet 6 is to be formed, and the edges 4a of the sealing material 4, and (vi) the structures 60" provided between the cut surface among the cut surfaces of the liquid crystal panel 91, on which cut surface the liquid crystal inlet 6 is to be formed, and the edges 4a of the sealing material 4 (see (a) of FIG. 9). The structures 60" are provided so as to sandwich the respective sealing materials 4' with the liquid crystal inlet 6. The CF substrate 2 and the TFT substrate 3 constitute a substrate assembly 9 (later described). Liquid crystal is injected through the liquid crystal inlet 6 into a region 5 which is sandwiched between the CF substrate 2 and the TFT substrate 3 and surrounded by the sealing material 4, so that the liquid crystal panel 91 is produced.

The width W' of the sealing material 4' is thus smaller than the width W of the sealing material 4. The structures 60" are separated from respective edges 6a and 6b of the liquid crystal inlet 6 by the width W'.

The liquid crystal inlet 6 of the liquid crystal panel 91 is formed between the CF substrate 2 and the TFT substrate 3 and between the two sealing materials 4' (see (c) of FIG. 9).

A process for producing the liquid crystal panel 91 includes a substrate assembly forming process and a substrate assembly cutting process. The substrate assembly forming process is a process for forming the substrate assembly 9 by bonding the CF substrate 2 and the TFT substrate 3 to each other such that the sealing material 4 is sandwiched between the CF substrate 2 and the TFT substrate 3. The substrate assembly cutting process is a process for scribing (cutting) the substrate assembly 9 in which the CF substrate 2 and the TFT substrate 3 are bonded to each other. First, the substrate assembly forming process will be described below with reference to (a) through (h) of FIG. 10.

FIG. 10 is an explanatory view of production of the liquid crystal panel 91 of Example 5. (a) through (h) of FIG. 10 are explanatory views of a process for producing the liquid crystal panel 91 of Example 5. According to the process illustrated in FIG. 2, the sealing material 4 is drawn (formed) on the CF substrate 2. Note, however, that the sealing material 4 can be drawn (formed) on the TFT substrate 3 instead of the CF substrate 2.

(a) of FIG. 10 is a plain view illustrating the CF substrate 2 onto which the sealing material 4 is to be drawn. (b) of FIG. 10 is a cross-sectional view taken along C-C' line of (a) of FIG. 10.

A sealing material draw line 7 is formed on the CF substrate 2 illustrated in (a) of FIG. 10. A draw nozzle (sealing material draw nozzle) 8 draws the sealing material 4 along the sealing material draw line 7. In (a) of FIG. 10, the sealing material 4 has not been drawn yet.

Structures 20", each made from a material from which the color filter is formed, are provided on the CF substrate 2. More specifically, a black matrix BM, a color filter CFR of R (red), a color filter CFG of G (green), a color filter CFB of B (blue), and an alignment film PI are accumulated in this order on the CF substrate 2, but no sealing material 4 is provided on the alignment film PI. That is, each of the structures 20" includes the black matrix BM, the color filter CFR of R (red), the color filter CFG of G (green), the color filter CFB of B (blue), and the alignment film PI.

Note that the structure 20" and a structure 40" (later described), are separated from the respective edges 6a and 6b of the liquid crystal inlet 6 by the width W'.

(c) of FIG. 10 is a plain view illustrating the CF substrate 2 onto which the sealing material 4 is being drawn where one of the structures 20" is provided. (d) of FIG. 10 is a cross-sectional view taken along C-C' line of (c) of FIG. 10. The draw nozzle 8 draws the sealing material 4, for example, from a start edge 7a of the sealing material draw line 7 to an end edge 7b of the sealing material draw line 7.

The sealing material 4 is drawn so as to partially cover the structure 20" of the left side of the C-C' line cross-sectional view of (d) of FIG. 10. That is, the sealing material 4 is partially drawn on the alignment film PI of the structure 20". However, the sealing material 4 is repelled from the alignment film PI. Therefore, no sealing material 4 is left on the alignment film PI (see (f) of FIG. 10).

(e) of FIG. 10 is a plain view illustrating the CF substrate 2 on which the sealing material 4 is being drawn along a part of the sealing material draw line 7, which part follows the structure 20". (f) of FIG. 10 is a cross-sectional view taken along C-C' line of (e) of FIG. 10. The sealing material 4 drawn on the alignment film PI is repelled from the alignment film PI, because of the above-described reason (see the C-C' line cross-sectional view of (f) of FIG. 10). The width W' of the sealing material 4' is thus smaller than the width W of the sealing material 4.

(g) of FIG. 10 is a plain view illustrating the substrate assembly 9 in which the CF substrate 2 on which the sealing material 4 has been drawn, and the TFT substrate 3 are bonded to each other. On the TFT substrate 3, the structures 40" (not shown) having a configuration identical to that of structures 40 are provided. (h) of FIG. 10 is a cross-sectional view taken along a scribing line 12 of (g) of FIG. 10. The TFT substrate 3, and the CF substrate 2 on which the draw nozzle 8 has drawn the sealing material 4 from the start edge 7a to the end edge 7b, are bonded to each other so as to form the substrate assembly 9. The cross-sectional view of (h) of FIG. 10 illustrates the two structures 60" and the two sealing materials 4'.

The following describes the substrate assembly cutting process with reference to (a) and (b) of FIG. 10. The substrate assembly 9 illustrated in (a) and (b) of FIG. 10 is scribed by use of a diamond cutter (a scribing cutter or a glass cutter) 10. Specifically, the diamond cutter 10 scribes the CF substrate 2 and the TFT substrate 3 along scribing lines 11 through 13 illustrated in (g) of FIG. 10. Further, the diamond cutter 10 scribes the CF substrate 2 along a CF substrate scribing line 14 illustrated in (g) of FIG. 10, and scribes the TFT substrate 3 along a TFT substrate scribing line 15 illustrated in (g) of FIG. 10. Thereafter, liquid crystal is injected through the liquid crystal inlet 6 into the region 5 surrounded by the sealing material 4, so that the liquid crystal panel 91 illustrated in (a) of FIG. 9 is produced.

A gap d between the edges 4a of the sealing material 4 and the scribing line 12 along which the structures 60'' are to be cut is more than 0 μm but not more than 300 μm (see (b) of FIG. 9, that is, the enlarged view of the region surrounded by the alternate long and short dash line A of (a) of FIG. 9). A part which is scribed along the scribing line 12 becomes an edge of the liquid crystal inlet 6 (that is, the B-B' line cross-sectional view of (c) of FIG. 9 illustrates the edge of the liquid crystal inlet 6).

The structures 60'' and the sealing materials 4' are provided between the CF substrate 2 and the TFT substrate 3 (see the B-B' line cross-sectional view of (c) of FIG. 9). In each of the structures 60'', the black matrix BM, the color filter CFR of R (red), the color filter CFG of G (green), the color filter CFB of B (blue), the alignment film PI, a transparent insulating resin 46, a protective film 45, a source drain metal 44, amorphous silicon (a-Si) 43, a gate insulating film 42, and a gate metal 41 are accumulated in this order. The sealing materials 4' are provided between the liquid crystal inlet 6 and the respective structures 60''.

According to the process for producing the liquid crystal panel 51 of Example 5, the structures 60'' and the sealing materials 4' are thus provided between the cut surface among the cut surfaces of the liquid crystal panel 51, on which cut surface the liquid crystal inlet 6 is to be formed, and the edges 4a of the sealing material 4 (on the scribing line 12 so as to sandwich the liquid crystal inlet 6).

The structures 60'' each are made from the material from which the color filter is formed and the material from which the thin film transistor is formed, and the width W' of the sealing material 4' is smaller than the width W of the sealing material 4. This decreases change in pressure to be applied by a scribing cutter during formation of the liquid crystal inlet 6, as compared with during production of a conventional liquid crystal panel. Therefore, a defect such as burr and crack can be reduced. That is, the defect such as burr and crack is further unlikely to be caused, or can be reduced in its size.

Note that the cut surface among the cut surfaces of the liquid crystal panel 31, 51, 71 or 91, on which cut surface the liquid crystal inlet 6 is to be formed, is formed by scribing the substrate assembly 9 along the scribing line 12.

Liquid Crystal Display Device

A liquid crystal display device of the present embodiment includes the liquid crystal panel 1, 31, 51, 71 or 91. Therefore, a defect, such as burr and crack, which is caused during production of a conventional liquid crystal panel can be reduced. That is, the defect such as burr and crack is further unlikely to be caused, or can be reduced in its size.

Method for Producing Liquid Crystal Panel

A method for producing the liquid crystal panel 1, 31, 51, 71 or 91 of the present embodiment is a method for producing a liquid crystal panel including the steps of: forming a color filter on a CF substrate 2; forming a thin film transistor on a TFT substrate 3; forming structures 20, 40, 60 or 60'', on the CF substrate 2 or the TFT substrate 3, between a cut surface among cut surfaces of the liquid crystal panel, on which cut surface a liquid crystal inlet 6 is to be formed, and edges 4a of a sealing material 4; forming, on the CF substrate 2 or the TFT substrate 3, the sealing material 4 for sealing liquid crystal injected between the CF substrate 2 and the TFT substrate 2; forming a substrate assembly 9 by bonding the CF substrate 2 and the TFT substrate 3 to each other; and forming the liquid crystal panel by scribing the substrate assembly 9, the structures 20, 40, 60 or 60'' each being made from a material from which the color filter is formed or a material from which the thin film transistor is formed.

According to the method for producing the liquid crystal panel, the structures 20, 40, 60 or 60'' each can be made from the material from which the color filter is formed and the material from which the thin film transistor is formed.

The method for producing the liquid crystal panel can further include the step of providing structures 60' along a periphery of the CF substrate 2 or a periphery of the TFT substrate 3, each of which structures 60' is made from a material identical to that from which the structures 20, 40, 60 or 60'' is formed.

The method for producing the liquid crystal panel can further include the step of forming sealing materials 4' between the cut surface among the cut surfaces of the liquid crystal panel, on which cut surface the liquid crystal inlet 6 is to be formed, and the edges 4a of the sealing material 4, and the sealing materials 4' can have respective widths W' smaller than a width W of the sealing material 4.

The method for producing the liquid crystal panel makes it possible to decrease change in pressure to be applied by a scribing cutter during formation of the liquid crystal inlet 6 (during cutting of the substrate assembly 9), as compared with during production of a conventional liquid crystal panel. Therefore, a defect, such as burr and crack, which is caused during production of the conventional liquid crystal panel can be reduced. That is, the defect such as burr and crack is further unlikely to be caused, or can be reduced in its size.

The first structures of the liquid crystal panel each can be made from the material from which the color filter is formed and the material from which the thin film transistor is formed.

According to the method for producing the liquid crystal panel, the first structures each can be made from the material from which the color filter is formed and the material from which the thin film transistor is formed.

This makes it possible to decrease change in pressure to be applied by a scribing cutter during formation of the liquid crystal inlet (during cutting of the substrate assembly), as compared with during production of a conventional liquid crystal panel. Therefore, a defect, such as burr and crack, which is caused during production of the conventional liquid crystal panel can be reduced. That is, the defect such as burr and crack is further unlikely to be caused, or can be reduced in its size.

The liquid crystal panel can further include second structures provided along a periphery of the filter substrate or a periphery of the transistor substrate, each of which second structures is made from a material identical to that from which the first structures are formed.

The method for producing the liquid crystal panel can further includes the step of providing second structures along a periphery of the filter substrate or a periphery of the transistor substrate, each of which second structures is made from a material identical to that from which the first structures are formed.

This makes it possible to decrease change in pressure to be applied by a scribing cutter during formation of the liquid crystal inlet (during cutting of the substrate assembly), as compared with during production of a conventional liquid crystal panel. Therefore, a defect, such as burr and crack, which is caused during production of the conventional liquid crystal panel can be reduced. That is, the defect such as burr and crack is further unlikely to be caused, or can be reduced in its size.

The liquid crystal can further include second sealants between the cut surface among the cut surfaces of the liquid crystal panel, on which cut surface the liquid crystal inlet is to be formed, and the edges of the first sealant, and the second sealants can be smaller in width than the first sealant.

The method for producing the liquid crystal panel can further include the step of forming second sealants between the cut surface among the cut surfaces of the liquid crystal panel, on which cut surface the liquid crystal inlet is to be formed, and the edges of the first sealant, and the second sealants can be smaller in width than the first sealant.

The first structures each are made from the material from which the color filter is formed or the material from which the thin film transistor is formed, and the second sealants are smaller in width than the first sealant. This decreases change in pressure to be applied by a cutter during formation of the liquid crystal inlet (during cutting of the substrate assembly), as compared with during production of a conventional liquid crystal panel. Therefore, a defect such as burr and crack can be reduced. That is, the defect such as burr and crack is further unlikely to be caused, or can be reduced in its size.

A liquid crystal display device of the present invention includes any one of the liquid crystal panels. Therefore, a defect, such as burr and crack, which is caused during production of a conventional liquid crystal panel can be reduced. That is, the defect such as burr and crack is further unlikely to be caused, or can be reduced in its size.

A method of the present invention for producing a liquid crystal display device includes any one of the methods for producing the liquid crystal panel. Therefore, a defect, such as burr and crack, which is caused during production of a conventional liquid crystal panel, can be reduced. That is, the defect such as burr and crack is further unlikely to be caused, or can be reduced in its size.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

Method for Producing Liquid Crystal Display Device

A method for producing a liquid crystal display device of the present embodiment includes the method for producing the liquid crystal panel 1, 31, 51, 71 or 91. Therefore, a defect, such as burr and crack, which is caused during production of a conventional liquid crystal panel can be reduced. That is, the defect such as burr and crack is further unlikely to be caused, or can be reduced in its size.

INDUSTRIAL APPLICABILITY

According to the present invention, it is possible to reduce a defect, such as burr and crack, which is caused during production of a conventional liquid crystal panel. Therefore, the present invention is suitably applicable to a liquid crystal display device.

REFERENCE SIGNS LIST 1, 31, 51, 71 and 91: liquid crystal panel
2: CF substrate (filter substrate)
3: TFT substrate (transistor substrate)
4: sealing material (first sealant)
4a: edge
5: region
6: liquid crystal inlet
6a: edge
6b: edge
7: sealing material draw line
7a: start edge
7b: end edge
8: draw nozzle
9: substrate assembly
10: diamond cutter
11 through 13: CF substrate/TFT substrate scribing line
14: CF substrate scribing line
15: TFT substrate scribing line
20, 40, 60 and 60": structure (first structure)
37: sealing material draw line
37a: start edge
37b: end edge
41: gate metal
42: gate insulating film
43: a-Si
44: source drain metal
45: protective film
46: transparent insulating resin
60': structure (second structure)
A: alternate long and short dash line
BM: black matrix
CFB, CFG and CFR: color filter
E1 and E2: cavity
PI: alignment film
d: gap

The invention claimed is:
1. A liquid crystal panel, comprising:
a filter substrate on which a color filter is formed;
a transistor substrate on which a thin film transistor is formed;
a first sealant for sealing liquid crystal injected between the filter substrate and the transistor substrate;
a liquid crystal inlet through which the liquid crystal is injected; and
first structures being provided between a cut surface among cut surfaces of the liquid crystal panel, on which cut surface the liquid crystal inlet is to be formed, and edges of the first sealant,
the first structures each being made from a material from which the color filter is formed and a material from which the thin film transistor is formed.
2. A liquid crystal panel, comprising:
a filter substrate on which a color filter is formed;
a transistor substrate on which a thin film transistor is formed;
a first sealant for sealing liquid crystal injected between the filter substrate and the transistor substrate;
a liquid crystal inlet through which the liquid crystal is injected; and
first structures being provided between a cut surface among cut surfaces of the liquid crystal panel, on which cut surface the liquid crystal inlet is to be formed, and edges of the first sealant,
the first structures each being made from a material from which the color filter is formed or a material from which the thin film transistor is formed,
second structures provided along a periphery of the filter substrate or a periphery of the transistor substrate, each of which second structures is made from a material identical to that from which the first structures are formed.

3. A liquid crystal panel, comprising:

a filter substrate on which a color filter is formed;

a transistor substrate on which a thin film transistor is formed;

a first sealant for sealing liquid crystal injected between the filter substrate and the transistor substrate;

a liquid crystal inlet through which the liquid crystal is injected; and first structures being provided between a cut surface among cut surfaces of the liquid crystal panel, on which cut surface the liquid crystal inlet is to be formed, and edges of the first sealant, the first structures each being made from a material from which the color filter is formed or a material from which the thin film transistor is formed, second sealants between the cut surface among the cut surfaces of the liquid crystal panel, on which cut surface the liquid crystal inlet is to be formed, and the edges of the first sealant, and the second sealants being smaller in width than the first sealant.

* * * * *